United States Patent
Sheikh Faridul et al.

(10) Patent No.: US 10,853,677 B2
(45) Date of Patent: Dec. 1, 2020

(54) VERIFICATION METHOD AND SYSTEM

(71) Applicant: Eyn Limited, London (GB)

(72) Inventors: Hasan Sheikh Faridul, London (GB);
Mohamed Ben Arbia, London (GB)

(73) Assignee: Eyn Limited, London (GB)

( * ) Notice: Subject to any disclaimer, the term of this patent is extended or adjusted under 35 U.S.C. 154(b) by 0 days.

(21) Appl. No.: 15/913,921

(22) Filed: Mar. 7, 2018

(65) Prior Publication Data

US 2018/0260643 A1    Sep. 13, 2018

(30) Foreign Application Priority Data

Mar. 7, 2017    (GB) .................................. 1703664.1

(51) Int. Cl.
*G06K 9/00*    (2006.01)
*G06T 7/246*    (2017.01)

(52) U.S. Cl.
CPC ..... *G06K 9/00906* (2013.01); *G06K 9/00228* (2013.01); *G06K 9/00261* (2013.01); *G06K 9/00302* (2013.01); *G06K 9/00315* (2013.01); *G06K 9/00597* (2013.01); *G06T 7/251* (2017.01); *G06T 2207/10004* (2013.01); *G06T 2207/20081* (2013.01); *G06T 2207/30201* (2013.01); *G06T 2207/30204* (2013.01)

(58) Field of Classification Search
CPC ........... G06K 9/00906; G06K 9/00228; G06K 9/00302; G06K 9/00315; G06K 9/00597; G06T 7/251
See application file for complete search history.

(56) References Cited

U.S. PATENT DOCUMENTS

| 8,219,438 | B1* | 7/2012 | Moon ................ G06Q 30/0201 |
| | | | 705/7.29 |
| 8,787,638 | B2* | 7/2014 | Zee ......................... A61B 3/12 |
| | | | 382/128 |
| 8,856,541 | B1 | 10/2014 | Chaudhury et al. |
| 8,957,847 | B1* | 2/2015 | Karakotsios .......... G06F 3/0484 |
| | | | 345/156 |
| 8,982,160 | B2* | 3/2015 | Yee ..................... G06F 3/04886 |
| | | | 345/661 |
| 9,230,158 | B1* | 1/2016 | Ramaswamy ..... G06K 9/00281 |
| | | | (Continued) | |

FOREIGN PATENT DOCUMENTS

| WO | WO 2014/184436 | 11/2014 |
| WO | WO 2017/025575 | 2/2017 |

OTHER PUBLICATIONS

European Search Report and the European Search Opinion dated Aug. 1, 2018 From the European Patent Office Re. Application No. 18160570.0. (10 Pages).

(Continued)

*Primary Examiner* — Mia M Thomas

(57) ABSTRACT

The present disclosure relates to a method of determining whether a live human face is present for use as part of a facial recognition system and/or method, whereby a moving stimulus is generated. Human face movement in response to the generated stimulus is predicted using a model. The stimulus is presented to a face of a person. A movement of the face in response to the stimulus is tracked using a camera, and it is determined whether a live human face is present by comparing the movement of the face against the prediction.

18 Claims, 17 Drawing Sheets

(56) References Cited

U.S. PATENT DOCUMENTS

| | | | | |
|---|---|---|---|---|
| 9,924,866 | B2* | 3/2018 | Tian | A61B 3/113 |
| 10,116,695 | B1* | 10/2018 | Sokolov | G06F 3/013 |
| 2008/0091512 | A1* | 4/2008 | Marci | G06Q 10/10 |
| | | | | 705/7.29 |
| 2010/0004977 | A1* | 1/2010 | Marci | G06Q 10/10 |
| | | | | 705/7.32 |
| 2012/0140993 | A1* | 6/2012 | Bruso | G06F 21/32 |
| | | | | 382/118 |
| 2013/0194177 | A1* | 8/2013 | Sakata | H04N 21/4223 |
| | | | | 345/156 |
| 2014/0044321 | A1* | 2/2014 | Derakhshani | G06K 9/00597 |
| | | | | 382/117 |
| 2014/0289834 | A1 | 9/2014 | Lindemann | |
| 2016/0050391 | A1* | 2/2016 | Schultz | H04N 7/144 |
| | | | | 348/14.07 |
| 2016/0062456 | A1* | 3/2016 | Wang | G06F 21/32 |
| | | | | 382/117 |
| 2016/0261793 | A1* | 9/2016 | Sivan | H04N 19/597 |
| 2016/0360970 | A1* | 12/2016 | Tzvieli | A61B 5/6803 |
| 2017/0024608 | A1* | 1/2017 | Kons | G06K 9/00268 |
| 2017/0115742 | A1* | 4/2017 | Xing | G06F 3/0485 |
| 2018/0164879 | A1* | 6/2018 | Moffat | G06F 3/017 |
| 2018/0314881 | A1* | 11/2018 | Sud | G06K 9/00671 |
| 2019/0034706 | A1* | 1/2019 | el Kaliouby | G06K 9/00288 |
| 2020/0125165 | A1* | 4/2020 | Pace | G06K 9/00315 |

OTHER PUBLICATIONS

Ali et al. "Liveness Detection Using Gaze Collinearity", 2012 Third International Conference on Emerging Security Technologies, EST, XP032248288, p. 62-65, Sep. 5, 2012. Abstract, Section 3, p. 63-64.

Kähm et al. "2D Face Liveness Detection: An Overview", Proceedings of the 2012 International Conference of the Biometrics Special Interest Group, BIOSIG 2012, XP032243124, p. 1-12, Sep. 6, 2012. Section 2.

Patents Act 1977: Search Report under Section 17(5) dated Sep. 4, 2017 From the Intellectual Property Office fo the United Kingdom of Great Britain Re. Application No. 1703664.1 (5 Pages).

Deravi et al. "Liveness Detection using Gaze Collinearity", Emerging Security Technologies (EST), Third International Conference, 5 Pages, Sep. 5-7, 2012. Abstract. Section 3.1.

Frischholz et al. "Avoidng Replay-Attacks in a Face Recognition System Using Head-Pose Estimation", Analysis and Modeling of Faces and Gestures, 2003. AMFG 2003. IEEE International Workshop, 2 Pages, Oct. 17, 2003.

* cited by examiner

VERIFICATION METHOD AND SYSTEM

RELATED APPLICATION

This application claims the benefit of priority of United Kingdom Patent Application No. 1703664.1 filed Mar. 7, 2017, the contents of which are incorporated herein by reference in their entirety.

FIELD AND BACKGROUND OF THE INVENTION

The present invention relates to a method of verifying that (or determining whether) a live human face is present. More particularly, the present invention relates to a method of verifying that (or determining whether) a live human face is present for use as part of a facial recognition system and/or method. The invention extends to a corresponding apparatus and system.

Facial recognition (also called face detection and verification) systems are used in a variety of applications (including surveillance, biometric identification, biometric authentication or access control, gaming and virtual reality, and driver monitoring systems) as a way of verifying the identity of a user.

Facial recognition systems typically involve enrolling an authorised user's face in a database, and, at a later time, automatically matching the authorised user's face presented to the system against one or more entries in the database based on a calculated index of similarity.

Such systems may be vulnerable to 'spoof' or 'presentation' attacks, in which an attacker claims an authorised user's identity by presenting a falsified face of the authorised user to the system, for example by use of a mask, a photograph, a video, or a virtual reality representation of the authorised user's face. This may mean that otherwise accurate facial recognition systems suffer from security risks.

Existing techniques for mitigating the risks of presentation attacks often require the cooperation and/or knowledge of the user/attacker. Furthermore, many existing techniques do not generalise well to a variety of use cases, which may reduce the utility of such techniques.

Aspects and embodiments of the present invention are set out in the appended claims. These and other aspects and embodiments of the invention are also described herein.

SUMMARY OF THE INVENTION

According to at least one aspect described herein, there is provided a method of determining whether a live human face is present, comprising: generating a stimulus; predicting, using a model, human face movement in response to said generated stimulus; presenting the stimulus to a face of a person; tracking a movement of the face in response to the stimulus using a camera; and determining whether a live human face is present by comparing the movement of the face against said prediction.

By generating a stimulus and predicting human face movement in response to the stimulus using a model, a dynamic method (i.e. that is not based on pre-determined scenarios) is provided, which may provide improved security.

Optionally, the model represents live human face movement in response to any generated and/or presented stimulus, optionally such that the model is a general model.

The stimulus may be generated based on a varying parameter. The method may then comprise the further step of generating the varying parameter in dependence on one or more dynamic properties, which are preferably properties of a user device adapted to implement the method. At least one of the properties is preferably clock time, wherein the properties may further comprise one or more of: location; orientation; rotation; and acceleration. The varying parameter and/or the stimulus itself may be generated on the fly. Optionally, the varying parameter comprises a random element.

The stimulus is preferably a visual stimulus, which may be presented via a display, preferably a screen. The stimulus may be a (preferably continuously) moving stimulus, wherein the stimulus may move along a path which is generated in dependence on the varying parameter.

The starting location and/or ending location of the path, as well as the colour, luminance and/or orientation of the stimulus itself, may be generated in dependence on the varying parameter. Optionally, the stimulus may vary in size.

Tracking a movement of the face may comprise determining a location of a gaze on the screen; and tracking a movement of the location of the gaze. Optionally, the model relates to a predicted correspondence distance and/or direction between a location of a gaze and a location of any stimulus at a particular time. The method may further comprise calculating a correspondence distance and/or direction between a location of a gaze and a location of the stimulus at a particular time. Determining whether a live human face is present may further comprise comparing the correspondence distance and/or direction against the predicted correspondence distance and/or direction for a particular time. Optionally, calculating the correspondence distance and/or direction is performed at the same time as presenting the stimulus to the face.

The stimulus may comprise a request that one or more particular expressions are performed. The model may then represent live human face movement during the performance of one or more particular expressions.

According to at least one aspect described herein, there is provided a method of determining whether a live human face is present, comprising: presenting a stimulus to a face of a person; the stimulus comprising a request that one or more particular expressions are performed; tracking a movement of the face in response to the stimulus using a camera; and determining whether a live human face is present by comparing the movement of the face against a model of live human face movement, wherein the model represents live human face movement in performing the one or more particular expressions.

Optionally, the model represents live human face movement of a particular person. The model may relate to a reference vector of a movement of one or more facial landmarks during the performance of the one or more particular expressions, optionally wherein tracking a movement of the face comprises determining a vector of a movement of one or more facial landmarks. The stimulus may comprise a request that one or more particular words are spoken or mouthed. The model optionally represents live human face movement in speaking or mouthing the one or more particular words.

According to at least one aspect described herein, there is provided a method of determining whether a live human face is present, comprising: presenting a stimulus to a face of a person; the stimulus comprising a request that one or more particular words are spoken or mouthed; tracking a movement of the face in response to the stimulus using a camera; and determining whether a live human face is present by comparing the movement of the face against a model of live human face movement, wherein the model represents live human face movement in speaking or mouthing the one or more particular words.

The model may relate to live human lip movement, wherein tracking a movement of the face may comprise capturing visual data relating to a movement of the lips. The request is optionally formed as a question, wherein the one or more particular words are a possible answer to the question. The method may further comprise any or all of the steps of: receiving audio data related to the person's response to the stimulus using a microphone; performing speech-to-text analysis on the audio data; and comparing text of the audio data against a database of text related to the one or more particular words.

Optionally, the stimulus comprises an interactive object. The stimulus may optionally form part of a game.

According to at least one aspect described herein, there is provided a method of determining whether a live human face is present, comprising: presenting a stimulus forming part of a game to a face of a person; the stimulus comprising an interactive object; tracking a movement of the face in response to the stimulus using a camera; and determining whether a live human face is present by comparing the movement of the face against a model of live human face movement, wherein the model represents live human face movement in interacting with the interactive object.

The game is optionally an augmented reality game, and the model optionally relates to the achievement of one or more objectives of the game. Determining whether a live human face is present may comprise determining whether the movement of the face is indicative of an interaction with the interactive object that causes one or more objectives of the game to be achieved.

An identity of the stimulus and/or one or more properties of the stimulus are used as inputs for the model. Preferably, the model comprises historic data, for example historic data related to the face to which the stimulus is presented. Optionally, the method further comprises collecting data related to the movement of the face for use in the model. Determining whether a live human face is present may comprise comparing the movement of the face against a threshold based on the model. The model is preferably a trained classifier, for example where the model includes a convolutional neural network. Optionally, data related to the movement of the face is transmitted for remote processing.

The method may comprise the further step of determining whether a live human face is present by determining whether the visual data indicates the presence of a three dimensional face.

According to at least one aspect described herein, there is provided a method of determining whether a live human face is present, comprising: using a camera, capturing visual data of a movement of a face relative to the camera; and determining whether a live human face is present by determining whether the visual data indicates the presence of a three dimensional face.

Optionally, the stimulus is presented to a face of a person. The stimulus may comprise a request that the camera and/or the face are moved, and/or a request that the camera and/or face are moved into a position for the camera to take a picture of the face. The movement may comprise a rotation of the camera and a rotation of the face, wherein the camera and the face may rotate so as to face each other. The movement may comprise an increase in distance between the camera and the face.

Frames of the visual data may be sampled, where the sampled frames may comprise a frame relating to an initial position of the face; a frame relating to a final position of the face; and one or more frames relating to a transitory position of the face. Determining whether a live human face is present may comprise attempting to construct a three dimensional image using the sampled frames. Optionally, attempting to construct a three dimensional image using the sampled frames further comprises receiving data from sensors of the or a user device adapted to implement the method, where such sensor data optionally relates to the orientation and/or position of the device.

Visual data may be received using a camera of the user device adapted to implement the method. The user device is optionally calibrated using further sensors of the user device. A compensation may optionally be applied to the visual data, where the compensation is dependent on the user device. The user device may be one of: a smartphone; a laptop computer; a desktop computer; or a tablet computer.

According to at least one aspect described herein, there is provided a method of verifying the identity of a user, comprising performing a method as described herein; and verifying the identity of the user by comparing biometric information of the user (which optionally comprises the appearance of a user's face) against a database of biometric information of verified users.

According to at least one aspect described herein, there is provided a system for determining whether a live human face is present, the system comprising: means for displaying a stimulus; a camera for capturing visual data of a face; means for storing a model of live human face movement; and a processor adapted to execute a computer program product comprising software code adapted to carry out the method.

According to at least one aspect described herein, there is provided apparatus for determining whether a live human face is present, comprising: a module adapted to generate a stimulus; a module adapted to predict, using a model, human face movement in response to said generated stimulus; a module adapted to present a stimulus to a face of a person; a module adapted to track a movement of the face in response to the stimulus; and a module adapted to determine whether a live human face is present by comparing the movement of the face against said prediction.

According to at least one aspect described herein, there is provided apparatus for determining whether a live human face is present, comprising: a module adapted to present a stimulus to a face of a person, optionally wherein the stimulus comprises one or more of: a request that one or more particular expressions are performed; and a request that one or more particular words are spoken or mouthed; a module adapted to track a movement of the face in response to the stimulus; and a module adapted to determine whether a live human face is present by comparing the movement of the face against a model of live human face movement, wherein the model represents one or more of: live human face movement in response to any stimulus; live human face movement in performing the one or more particular expressions; and live human face movement in speaking or mouthing the one or more particular words. The apparatus may optionally further comprise a screen for displaying the stimulus and/or a data store for storing a model of live human face movement.

According to at least one aspect described herein, there is provided apparatus for determining whether a live human face is present, comprising: a module adapted to capture visual data of a movement of a face; and a module adapted to determine whether a live human face is present by determining whether the visual data indicates the presence of a three dimensional face. The apparatus may optionally further comprise a camera for capturing visual data of a face. The apparatus may be in the form of one or more of: smartphone; a laptop computer; a desktop computer; or a tablet computer; an automated passport control gate; and an entry system.

According to at least one aspect described herein, there is provided a system for determining whether a live human face is present, comprising: a user device, comprising: a module adapted to generate a stimulus; a module adapted to present a stimulus to a face of a person; a module adapted to track a movement of the face in response to the stimulus; and a remote prediction module adapted to predict, using a model, human face movement in response to said generated stimulus; a remote determination module adapted to determine whether a live human face is present by comparing the movement of the face against said prediction.

According to at least one aspect described herein, there is provided a system for determining whether a live human face is present, comprising: a user device, comprising: a module adapted to present a stimulus to a face of a person via a screen, optionally wherein the stimulus comprises one or more of: a request that one or more particular expressions are performed; and a request that one or more particular words are spoken or mouthed; a module adapted to track a movement of the face in response to the stimulus via a camera; and a remote determination module adapted to determine whether a live human face is present by comparing the movement of the face against a model of live human face movement, wherein the model represents one or more of: live human face movement in response to any stimulus; live human face movement in performing the one or more particular expressions; and live human face movement in speaking or mouthing the one or more particular words.

According to at least one aspect described herein, there is provided a system for determining whether a live human face is present, comprising: a user device, comprising a module adapted to capture visual data of a movement of a face via a camera; and a remote determination module adapted to determine whether a live human face is present by determining whether the visual data indicates the presence of a three dimensional face.

In general, the invention may provide various approaches to detect the presence of a live human face in front of a facial recognition or enrolment feature. Each of the approaches has their own respective advantages or robustness against specific set of attacks. The approaches may be combined to provide synergistic advantages.

The invention extends to methods, system and apparatus substantially as herein described and/or as illustrated with reference to the accompanying figures.

The invention also provides a computer program or a computer program product for carrying out any of the methods described herein, and/or for embodying any of the apparatus features described herein, and a computer readable medium having stored thereon a program for carrying out any of the methods described herein and/or for embodying any of the apparatus features described herein.

The invention also provides a signal embodying a computer program or a computer program product for carrying out any of the methods described herein, and/or for embodying any of the apparatus features described herein, a method of transmitting such a signal, and a computer product having an operating system which supports a computer program for carrying out the methods described herein and/or for embodying any of the apparatus features described herein.

Any feature in one aspect of the invention may be applied to other aspects of the invention, in any appropriate combination. In particular, method aspects may be applied to apparatus aspects, and vice versa. As used herein, means plus function features may be expressed alternatively in terms of their corresponding structure, such as a suitably programmed processor and associated memory.

Furthermore, features implanted in hardware may generally be implemented in software, and vice versa. Any reference to software and hardware features herein should be construed accordingly.

As used herein, the term 'live human face' preferably connotes an actual face of a living human (i.e. not a recording or any other kind of indirect representation of a face of a living human).

As used herein, the term 'location of gaze' or 'point of gaze' preferably connotes a point of regard and/or a location where a user is looking.

As used herein, the term 'path' preferably connotes a course or direction in which an object moves in any way, including by translation, rotation, reflection, changing in size, or as a result of any other geometric transformation.

As used herein, the term 'stimulus' preferably connotes a visual object or image and a path which the object or image follows.

As used herein, the term 'face' preferably connotes a human face which includes the eyes. As used herein, the term 'face' is to be preferably understood to be interchangeable with the term 'head'.

As used herein, the term 'eyes' preferably connotes any periocular part of the human anatomy. Any reference to 'eyes' in the plural sense preferably also connotes a singular 'eye', and vice versa.

As used herein, any reference to 'movement of a face' in the context of a camera preferably connotes both movement of a face relative to a camera and movement of a camera relative to a face.

It should also be appreciated that particular combinations of the various features described and defined in any aspects of the invention can be implemented and/or supplied and/or used independently.

BRIEF DESCRIPTION OF THE SEVERAL VIEWS OF THE DRAWINGS

The invention will now be described, purely by way of example, with reference to the accompanying drawings, in which.

DESCRIPTION OF SPECIFIC EMBODIMENTS OF THE INVENTION

Figure 1:
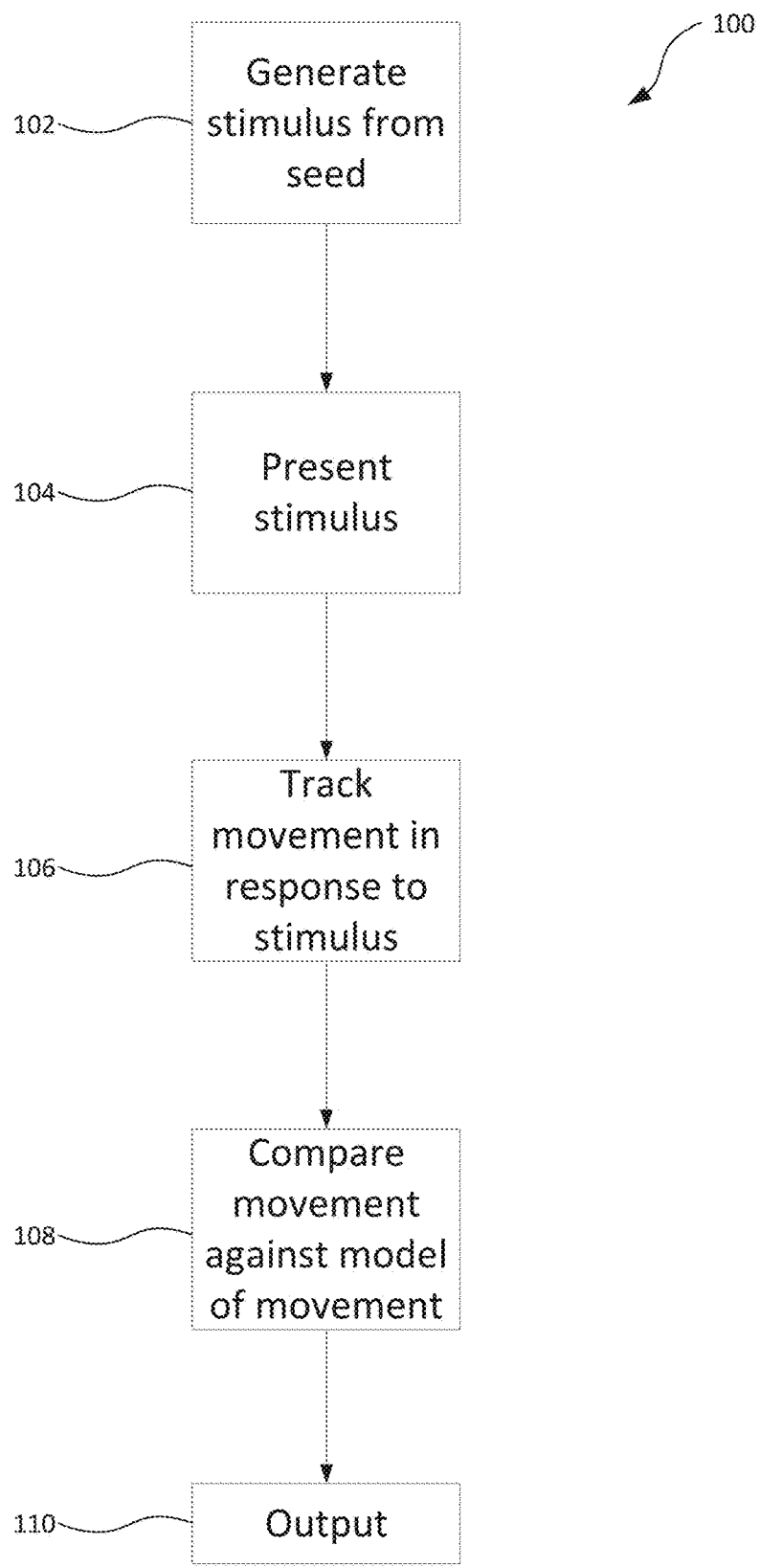
FIG. 1 is a flowchart of the steps of a method of determining whether a live human face is present.

FIG. 1 is a flowchart which illustrates the main steps of a method 100 for determining whether a live human face is present, which may find particular use as an initial stage in facial recognition systems in order to defend such systems against presentation attacks. In an embodiment, the method 100 is arranged to be implemented on a portable user device, such as a smartphone (or alternatively a tablet or laptop computer), although it will be appreciated that other implementations are of course possible.

In a first step 102, a visual stimulus is dynamically generated based on a varying parameter (or 'seed').

In a second step 104, a user of the user device and/or a face (or an object purporting to be a face) presented to the user device is presented with the stimulus on a screen of the user device.

In a third step 106, a movement of the user's face (in particular the eyes of the face) is tracked in response to the stimulus using visual data captured via a camera of the user device. It will be appreciated that typical user devices include a front-mounted camera (i.e. a camera arranged to face in the same direction as the screen), which may allow for the convenient acquisition of such visual data.

In a fourth step 108, the presence of a live human face is verified by comparing the tracked movement of the user's face against a pre-determined model of live human face movement, which is used to predict human face movement in response to the stimulus. If the tracked movement is determined to be sufficiently similar to the model of face movement, this indicates that a live human face is present. Tracking face movement in such a manner may allow a facial recognition system incorporating the method 100 to overcome presentation attacks, in particular those based on images or videos. An output 110 may then be produced, which may take the form of a message indicating that a real human face has been verified or has not been verified.

Figure 2A:
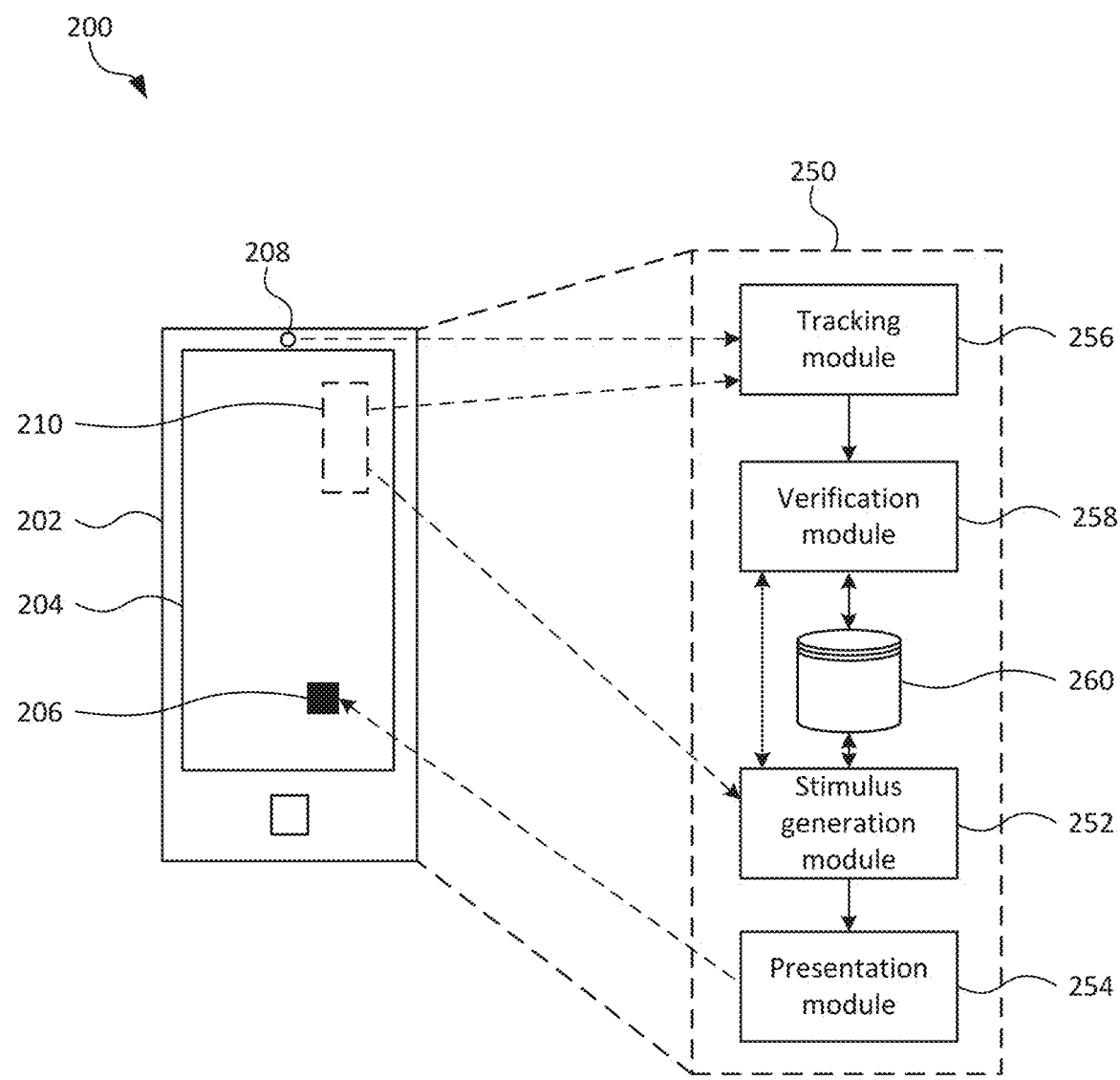
FIG. 2a is a schematic diagram of an apparatus adapted to implement the method.

Referring to FIG. 2a, there is shown an apparatus 200 for implementing the method 100. In this example, the apparatus 200 is in the form of a user device 202 having a screen 204. An exemplary stimulus 206 is shown on the screen. The user device further includes a camera 208 for capturing visual data of the user's face.

A schematic overview of the system memory or software architecture 250 of the user device 202 adapted to implement the method 100 is also shown. As illustrated, this includes a stimulus generation module 252 (configured to carry out the first step 102 of the method 100), a presentation module 254 (configured to carry out the second step 104 of the method 100), a tracking module 256 (configured to carry out the third step 106 of the method 100), a verification module (configured to carry out the fourth step 108 of the method 100), and a data store 260.

The stimulus generation module 252 is arranged to generate the stimulus 206, which is presented on the screen 204 by the presentation module 254. The tracking module 256 then receives visual data from the camera relating to a movement of the user's face in response to the stimulus. The visual data is then compared against a model stored in the data store 260 by the verification module 258. The stimulus generation module is also connectable to the verification module and/or the data store so as to allow details of the stimulus to be used as an input to the model.

Also shown schematically are sensors 210 of the user device, which, as will be described in more data later on, provide inputs for the stimulus generation module 252 (for use as part of the varying parameter) and to the tracking module 256 (for use in calibration and/or pre-processing).

Gaze Tracking

Figure 2B:
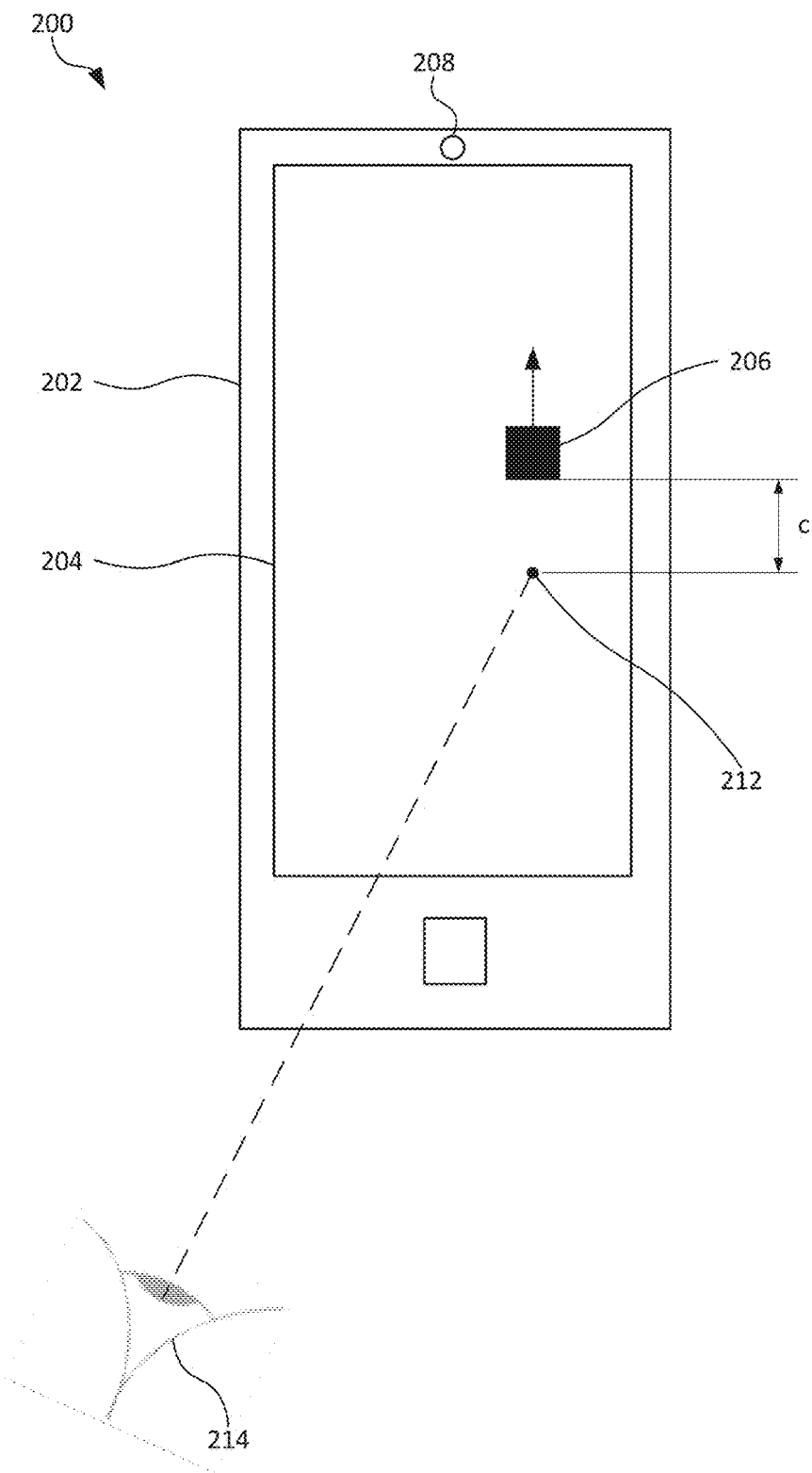
FIG. 2b is a schematic drawing of a user's interaction with the apparatus.

Referring to FIG. 2b, in an aspect, the method 100 relates to tracking a user's gaze in relation to a stimulus. A user's viewpoint 214 and the corresponding location 212 of the user's gaze on the screen are shown schematically in FIG. 2b.

As mentioned, the stimulus 206 is generated dynamically (i.e. the stimulus is generated immediately before it is presented to the user—this may be referred to as 'generation on the fly'), which provides for added security (as opposed to using one of a number of predetermined stimuli, for example). The stimulus is configured to be visually salient to users (i.e. sufficiently different from its surroundings so as to attract a user's visual attention), causing a user's gaze to move towards the stimulus. As such, the stimulus and the background on which the stimulus is provided are configured so that the stimulus stands out. This may be achieved, for example, by configuring the contrast between the stimulus and the background, the colour and luminescence of the stimulus and background, and the form, shape, and size of the stimulus accordingly.

The stimulus 206 is arranged to move with respect to time along a path, which is generated (along with the overall shape and appearance of the stimulus) based on the varying parameter. In particular, the start location, end location, and the overall direction of the path are separate properties of the stimulus which are generated based on the varying parameter.

The stimulus 206 moves at a sufficient speed such that a user's gaze can easily follow the stimulus while not overlapping the stimulus. Provided that the user continues to follow the moving stimulus with their gaze, the user's gaze will move along the same or a similar path to the stimulus while lagging behind the stimulus, as shown in the figure. As such, a distance c, referred to as the 'correspondence distance' separates the stimulus 206 and the user's gaze location 212 at any particular time while the stimulus is moving and the user is following the stimulus with their gaze.

Figure 3:
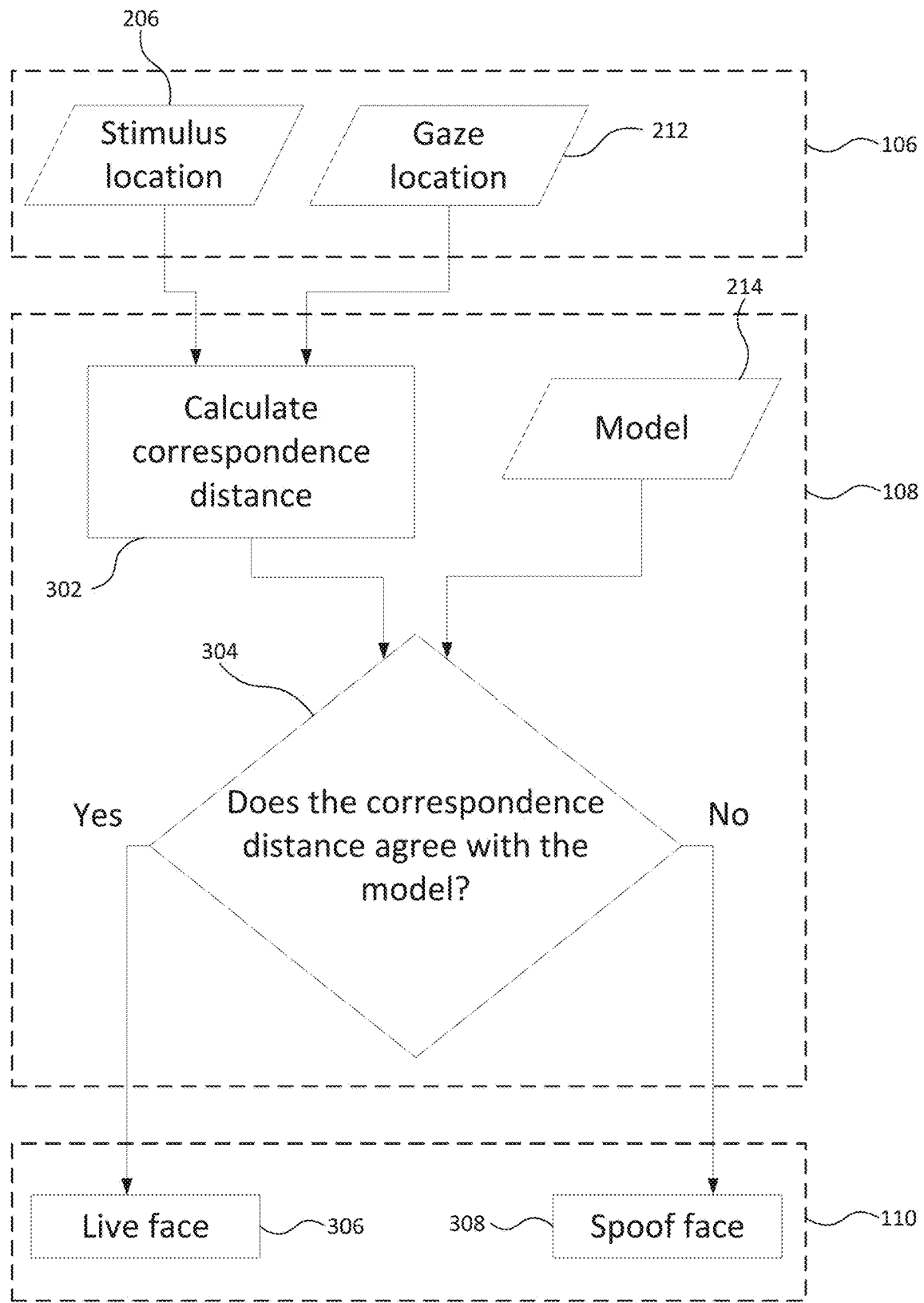
FIG. 3 is a flowchart showing certain steps of a first aspect of the method in more detail.

Referring to FIG. 3, the fourth step 108 of the method 100 is implemented by receiving information relating to the location of the stimulus 206 on the screen 204 and the user's gaze location 212 on the screen 204 and, in an first step 302, calculating the correspondence distance c based on the location of the stimulus 206 on the screen 204 and the user's gaze location 212 on the screen 204, which is determined using visual data from the camera 208. The location of the stimulus 206 may be determined from data relating to the path of the stimulus at a particular time, which may be saved into a database when the stimulus is generated. The user's gaze location 212 on the screen 204 may be determined using the tracking module 256, which may use an eye-tracking software package such as PyGaze.

In a second step 304, reference is made to a model 214 of live human face movement. The model is a generic model of human face movement in response to any stimulus that could be generated and/or presented as part of the method 100. More particularly, the model is a model of gaze location relative to stimulus location at a particular time. In use, the model 214 is a trained classifier based on a machine learning algorithm such as a convolutional neural network, which is trained based on historic data. The model 214 provides a prediction of the correspondence distance c for the particular properties of the generated stimulus 206 at a particular time.

As such, certain properties of the stimulus 206, an identifier of the stimulus, and/or the stimulus itself are, in use, used as an input to the model, which allows the model to produce a prediction that relates to the particular stimulus used. In one implementation, the location of the stimulus is provided to the model at the same time as it is presented to the user, allowing a 'live' prediction to be produced.

If the measured correspondence distance approximates the predicted correspondence within pre-determined confidence thresholds over a pre-determined time period, this indicates that a real user is genuinely following the stimulus with their gaze. As such, it can be determined that a real human face is present, which may be indicated as a positive output 306 in the output step 110. In one example, the confidence threshold is the 95$^{th}$ percentile of data available from the model.

If, however, the measured correspondence distance does not approximate the predicted correspondence distance within pre-determined confidence thresholds over a pre-determined time period, in particular in the case where the measured correspondence distance is much greater than the predicted correspondence data, this may indicate that a presentation attack is in progress. During such an attack, it may be possible to track a 'gaze' location and/or movement based on a falsified representation of a face that is presented to the user device, but such a falsified representation is either not able to follow the stimulus at all (in the case of an attack using an image or video) or is unable to follow the stimulus in a human-like way (in the case of a more sophisticated attack). As such, it can be determined that a real human face is not present, which may be indicated as a negative output 308 in the output step 110.

The correspondence distance is measured in real-time (or with a slight delay) as the stimulus is presented to the user, which may allow for more efficient processing as there is a reduced need to save data. The pre-determined time period may be the entire time during which the stimulus is presented to the user, where the correspondence distance must approximate the predicted correspondence distance for at least a predetermined portion of the time period in order for a live human face to be verified. The decision on whether a live human face is present may then take place after the stimulus is no longer presented to the user.

The stimulus 206 moves continuously along the path at a relatively constant speed, which may allow for eye movement relative to a stimulus to be more easily modelled. In an alternative, the stimulus may move discontinuously and/or at a varying speed, which may further improve the security of the method 100 (while requiring a more detailed model).

An alternative interpretation of the measured correspondence distance not approximating the predicted correspondence distance is that the user is failing to follow the stimulus. As such, prior to the presentation of the stimulus on the screen the user may be directed to follow the stimulus in order to verify themselves, for example via a message on the screen.

Figure 4:
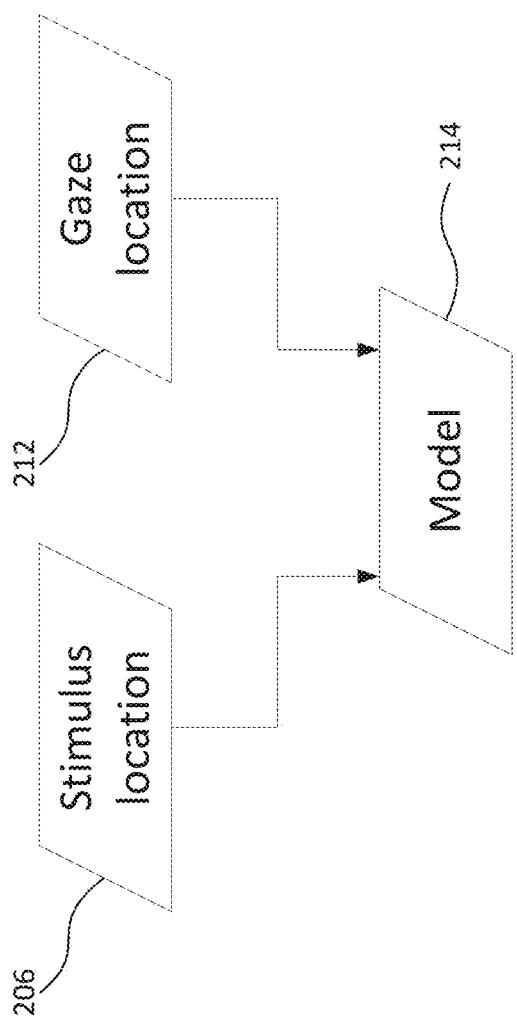
FIG. 4 is a flowchart showing the training of an eye tracking model for use with the method.

Referring to FIG. 4, as mentioned, the model 214 is trained 'offline' using historic or training data relating to stimulus location on a screen and a user's gaze location. In a simple example, the model might only relate to correspondence distance, where a stimulus moves constantly at a predetermined speed. This may allow for the presence of a live human face to be verified without reference to the properties of the stimulus. Such a model typically assumes that the eye exactly follows a stimulus with a defined time delay, which is dependent on human reaction time and the properties of the user device (in particular, the accuracy of the camera and image processing components of the user device). This may lead to significant differences in the modelled time delay between different user devices (for example, data based on typical mobile devices may have a time delay of around 500 ms, while data based on high performance mobile devices such as the iPhone® 6S may have a time delay of between 250 ms and 450 ms).

As such, the model may apply a predetermined compensation to training data and/or real data received from the user device, where the compensation is dependent on the processing power of the user device. The use of a compensation may allow data received from different user devices to be normalised.

In a more complex example, the model may relate to a correspondence distance in relation to specific properties of stimuli, such as speed, features of a path (such as start location, end location, or direction), and the appearance of the stimulus (for example, the use of stimulus paths involving tight corners may cause the correspondence distance to be reduced when the stimulus is around the corners). In an example implementation of such a model, the stimulus generation module may provide information to the verification module 258.

Figure 5:
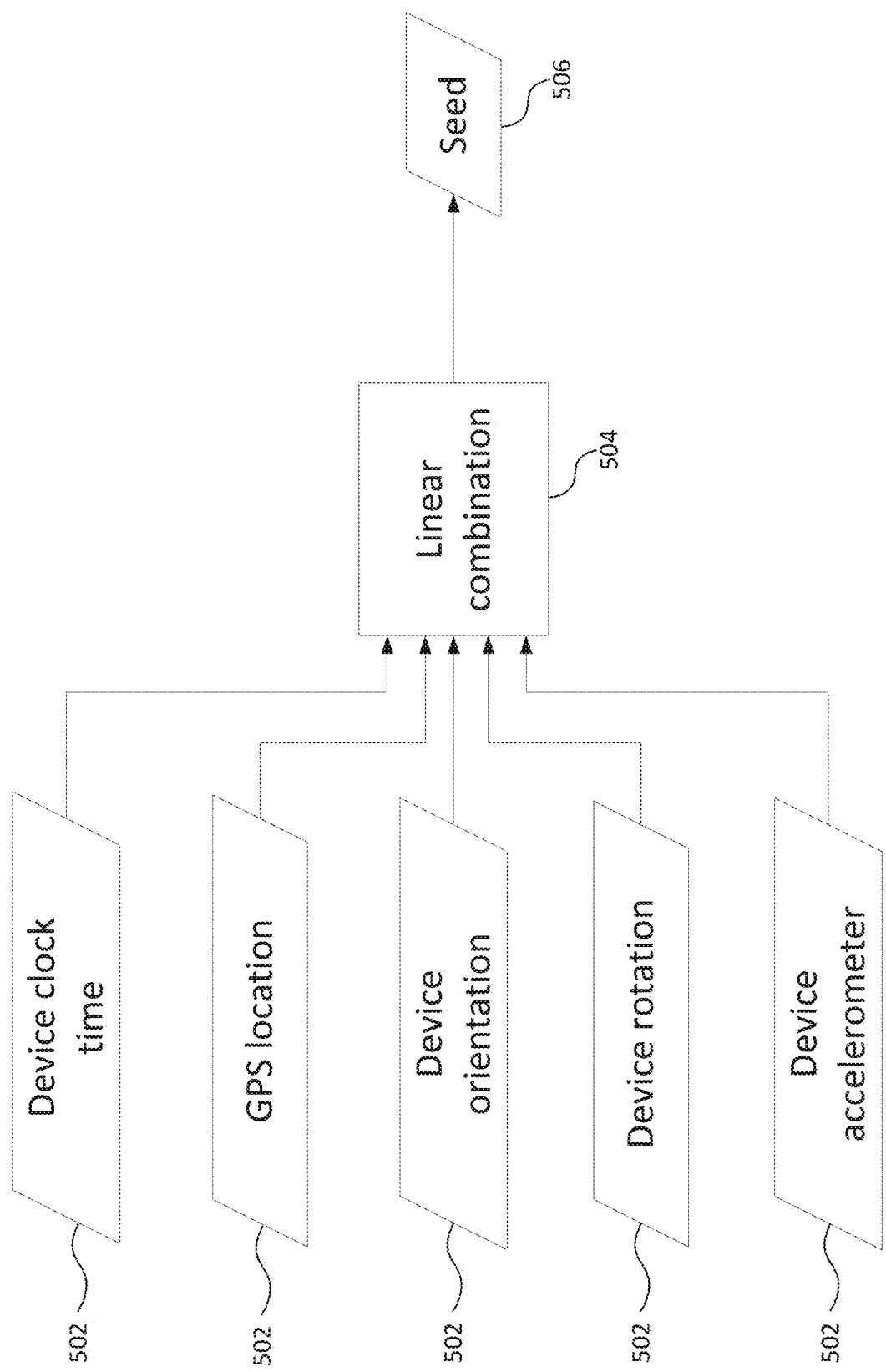
FIG. 5 is a flowchart showing how a seed for a stimulus is generated.

Referring to FIG. 5, as mentioned, the stimulus 206 is generated based on a varying parameter (or seed) 506. The seed 506 is generated based on a mathematical operation 504 (such as a linear combination) performed on a variety of dynamic properties 502 of the user device, including at least device clock time. By generating the seed 506 based on at least device clock time, a constantly changing seed 506 is provided, which may provide improved security. The properties 502 may also include those properties which are detectable using sensors of the device, such as location (provided by a satellite navigation system such as GPS), orientation, rotation or other movement, and acceleration. Other possible properties include ambient light, ambient sound, atmospheric pressure, ambient temperature, battery temperature, air humidity, and radiation level. The use of such further properties may strengthen the security of the seed 506 by making it more difficult for an attacker to predict the seed (and thereby to predict the stimulus). As will be appreciated, the seed is generated 'on the fly' (i.e. immediately before use), which further improves security.

Figure 6:
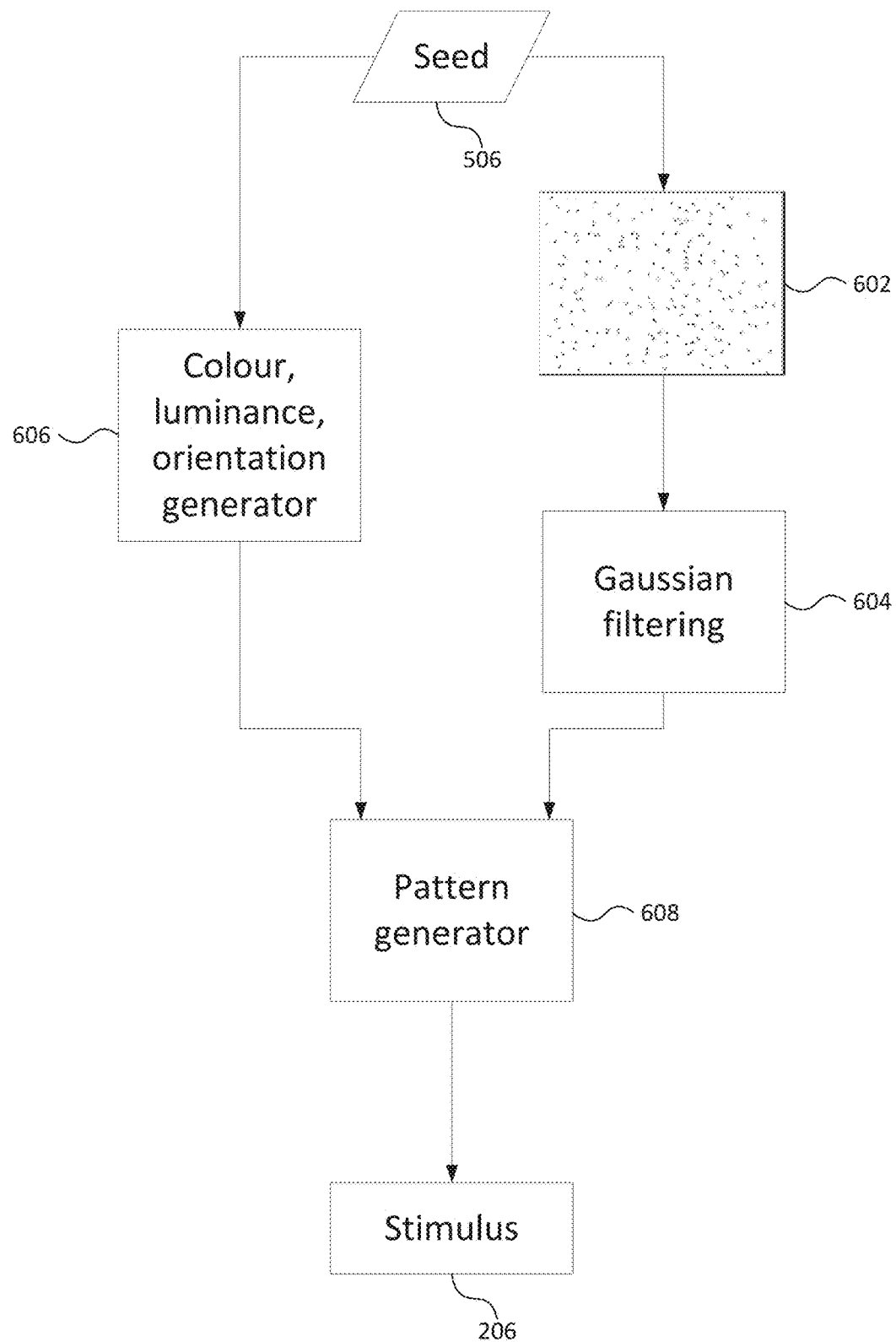
FIG. 6 is a flowchart showing how a stimulus is generated from a seed.

Referring to FIG. 6, the seed 506 (which is in the form of a string of digits) may be formed into an array 602 of unstructured data. In order to generate a stimulus 206, a low pass filter 604, such as a Gaussian filter, is applied to the array 602. This assists in avoiding a disturbing stimulus which the user may find annoying and/or difficult to track. The filtered array is then used as an input to a pattern generator 608, which is arranged to perform one or more mathematical operations so as to produce the properties of the path of the stimulus as well as other properties of the stimulus (such as the background and/or any surrounding objects). The seed 506 itself is also used as an input to a further generator 606, which is arranged to determine at least the colour, luminance, and orientation of the stimulus. The colour, luminance, and orientation of the stimulus are used as inputs into the pattern generator 608, which generates the stimulus partially in dependence on such inputs (for example, the background to the stimulus may be selected so as to ensure that a contrast is provided with respect to the stimulus, increasing visual salience).

It will be appreciated that a wide variety of stimuli are possible, with the properties of each stimuli being generated based on a unique seed. Each stimulus generated preferably has at least a unique path (which may be bounded by the screen, for example), while all of its other properties (for example, size, shape, and speed) may be generated from a list of predetermined properties based on the unique seed. As such, the stimulus as a whole may be referred to as unique.

Figure 7D:
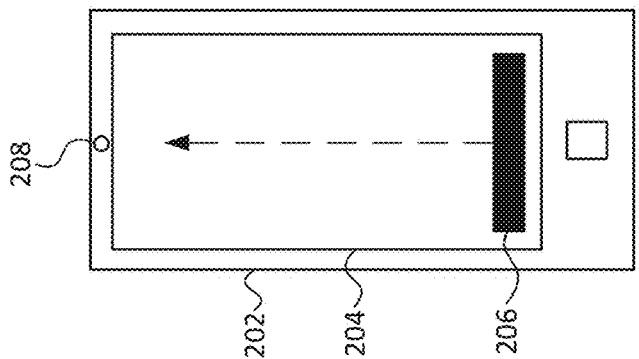
FIGS. 7a, 7b, 7c and 7d are schematic drawings showing the movement of various exemplary stimuli.
Figure 7C:
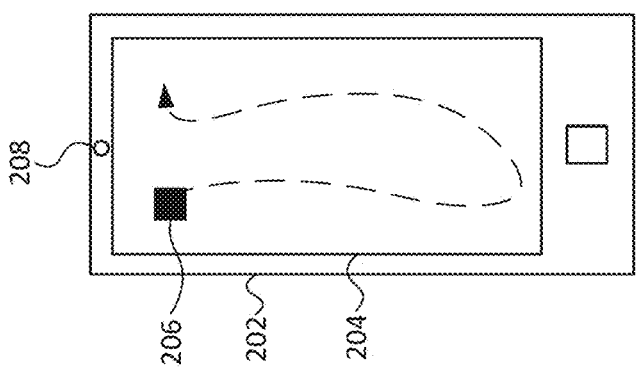
Figure 7B:
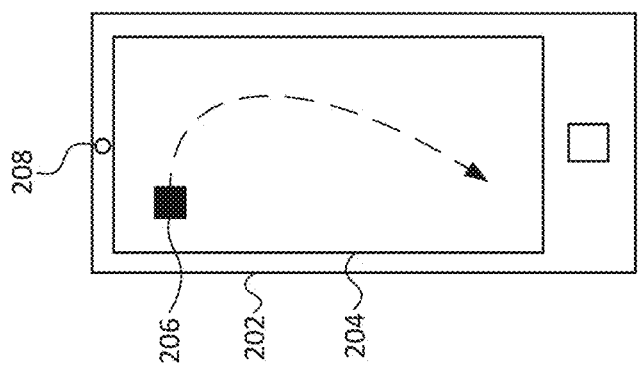
Figure 7A:
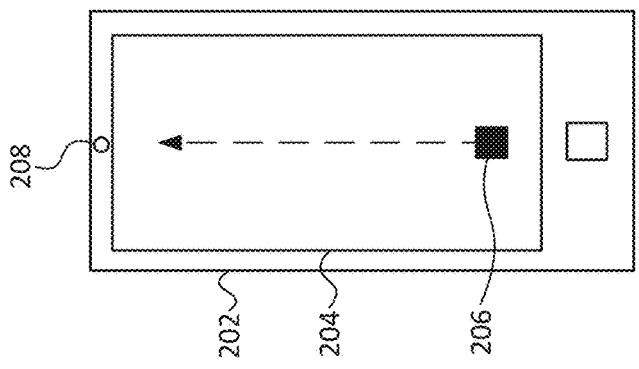
Figure 8D:
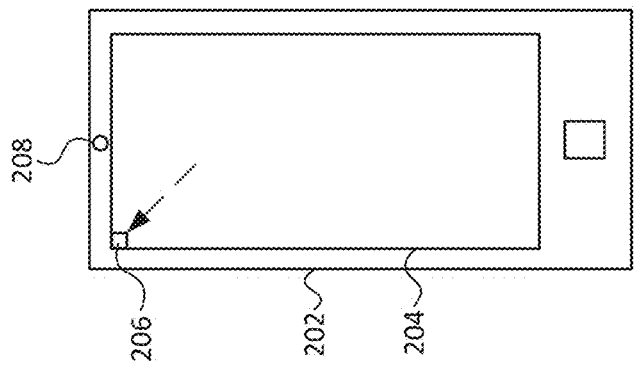
FIGS. 8a, 8b, 8c and 8d are schematic drawings showing the movement of another exemplary stimulus.
Figure 8C:
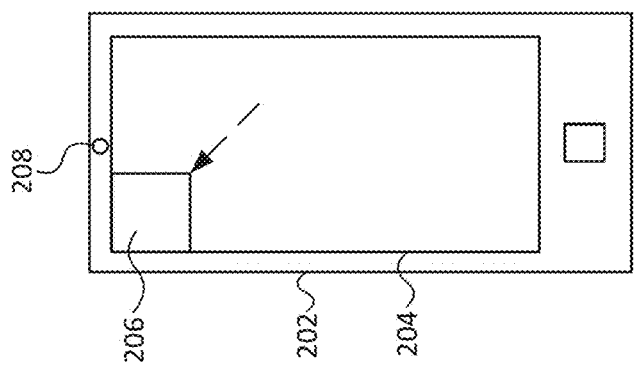
Figure 8B:
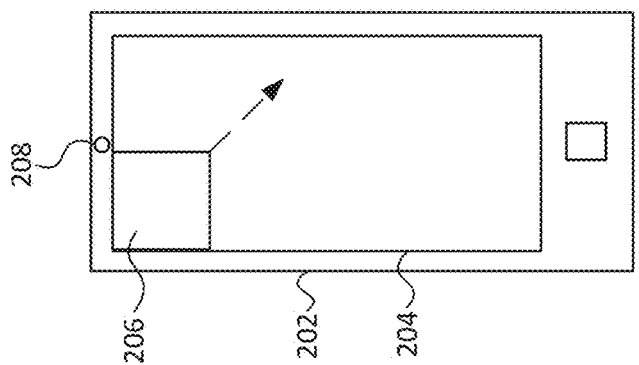
Figure 8A:
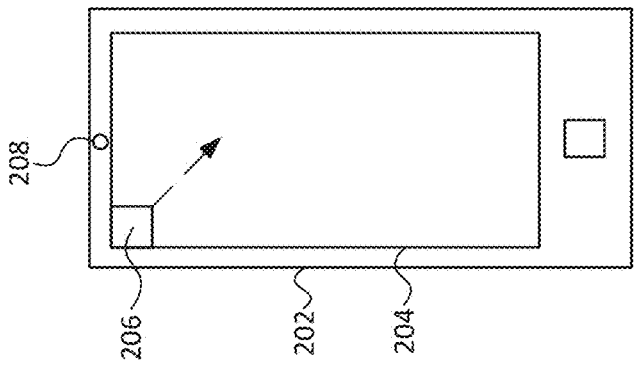

Referring to FIG. 7a, a basic stimulus is shown, which moves by being translated continuously in one direction. The stimulus has a square shape, and is shown in a black colour on a white background. Referring to FIGS. 7b and 7c, more complex stimuli are shown, each having an arcuate path along which the stimulus are translated. Referring to FIG. 7d, a bar-shaped stimulus is found, which is translated on a continuous path in one direction.

Referring to FIGS. 8a-d, an example of an alternative stimulus 206 is shown, which moves along a path by increasing and decreasing in size. In FIGS. 6a-b, the stimulus 'grows' out of one corner of the screen, before 'shrinking' back into the same corner and disappearing in FIGS. 8c-d. It will be appreciated that a stimulus may changes in size while also moving by being translated across a screen.

Figure 9C:
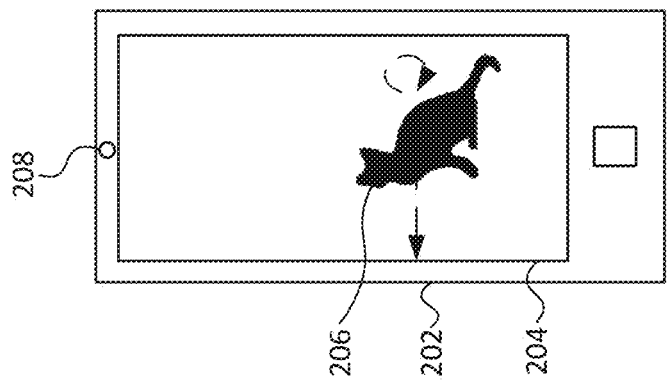
FIGS. 9a, 9b and 9c are schematic drawings showing the movement of yet another exemplary stimulus.
Figure 9B:
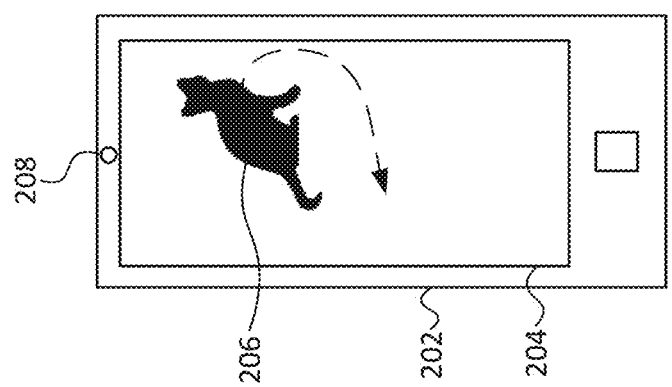
Figure 9A:
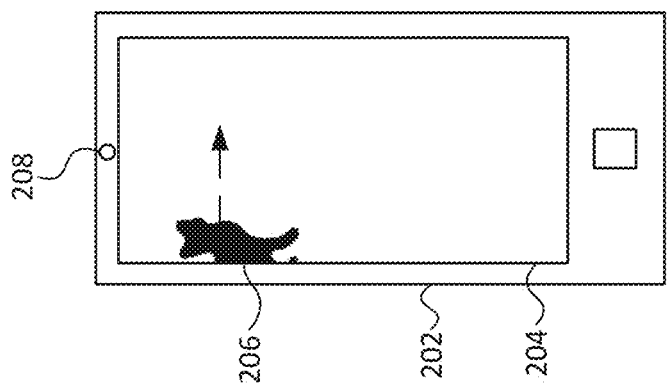

Referring to FIGS. 9a-c, the stimulus 206 may take the form of an animated character such as a cat, which may 'walk' on from one side of the screen, and follow a path defined by the seed, optionally changing directions or performing animations along the way.

As mentioned, the eye tracking aspects of the method 100 are based on visual data received from the camera 208, which is processed by the user device 200. The use of a user device, which is typically manually held in a user's hand rather than being mounted statically with respect to a user's face as in many eye tracking applications, may cause the user's face and eyes to be misaligned with respect to the camera. This may lead to errors or inaccuracies in eye tracking.

Figure 10:
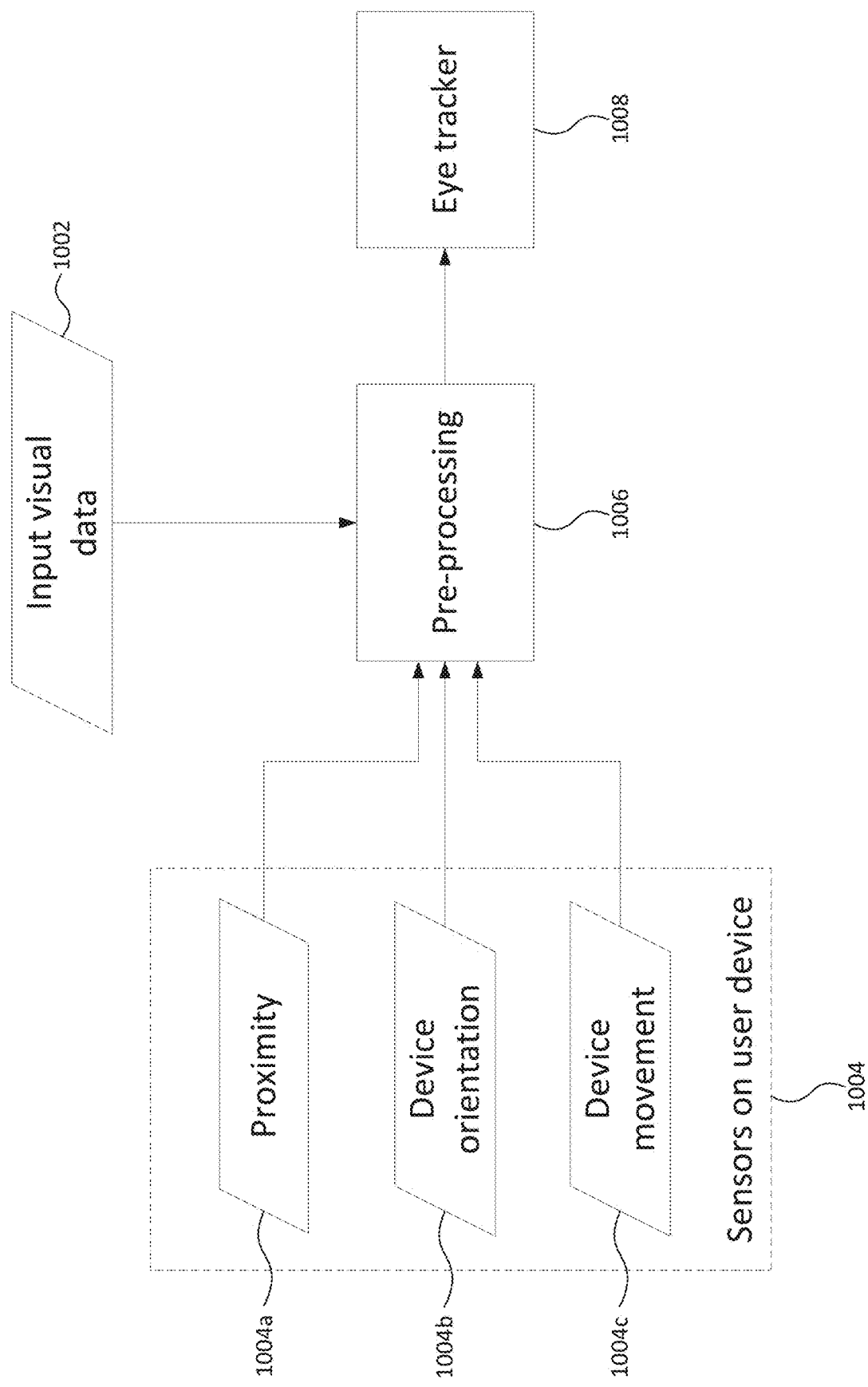
FIG. 10 is a flowchart showing how input visual data is pre-processed.

Referring to FIG. 10, there is provided a stabilisation system for pre-processing visual data received from the camera in order to improve the accuracy of eye tracking in the method 100. When input visual data 1002 is received at a processor of the user device, information from sensors 1004 of the user device is used in order to obtain information about the position of the camera in relation to the user's face. Such information may relate to the properties described in relation to the generation of the seed, and in particular may include the proximity 1004a of the user device to surrounding objects (in particular the user's face), the orientation 1004b of the user device, and any movement 1004c of the user device (including rotation). The processor of the user device may pre-process 1006 the data by using the information 1004a, 1004b, 1004c to warp the visual data 1002 into a canonical position (i.e. a position in which the user's eyes are directly aligned with the camera). The warped visual data may then be provided to an eye-tracking module 1008.

The pre-processing may alternatively occur away from the device, for example via a cloud server, where the user device transmits visual data to the server over an internet connection and receives the warped visual data as a response. Similarly, the eye tracking processing may be performed on the user device (at the eye tracking module 1008), or alternatively may be performed on an offline server.

It will be appreciated that the stimulus may be arranged to move in various different ways, which the model may take into account in determining whether a live human face in present. For example, the stimulus may be arranged to grow or shrink in size at a varying speed and/or at a varying spatial frequency. The stimulus may also be arranged to 'blink' (i.e. appear or disappear), for example while moving and/or changing in colour. In other examples, the stimulus may comprise a pattern having a visually salient area or section— for example, the stimulus may comprise a grid of objects, where one of the objects has a different orientation and/or is a different colour. Many other implementations of the stimulus are possible which are visually salient and allow the sure to easily (and trackably) follow the stimulus with their gaze.

In an alternative, a correspondence vector may be used instead of the correspondence distance (i.e. both the magnitude of the correspondence distance and the direction between the gaze location 212 and stimulus location 206 is determined), which may allow for more sophisticated modelling and eye tracking.

Other Aspects

Figure 11:
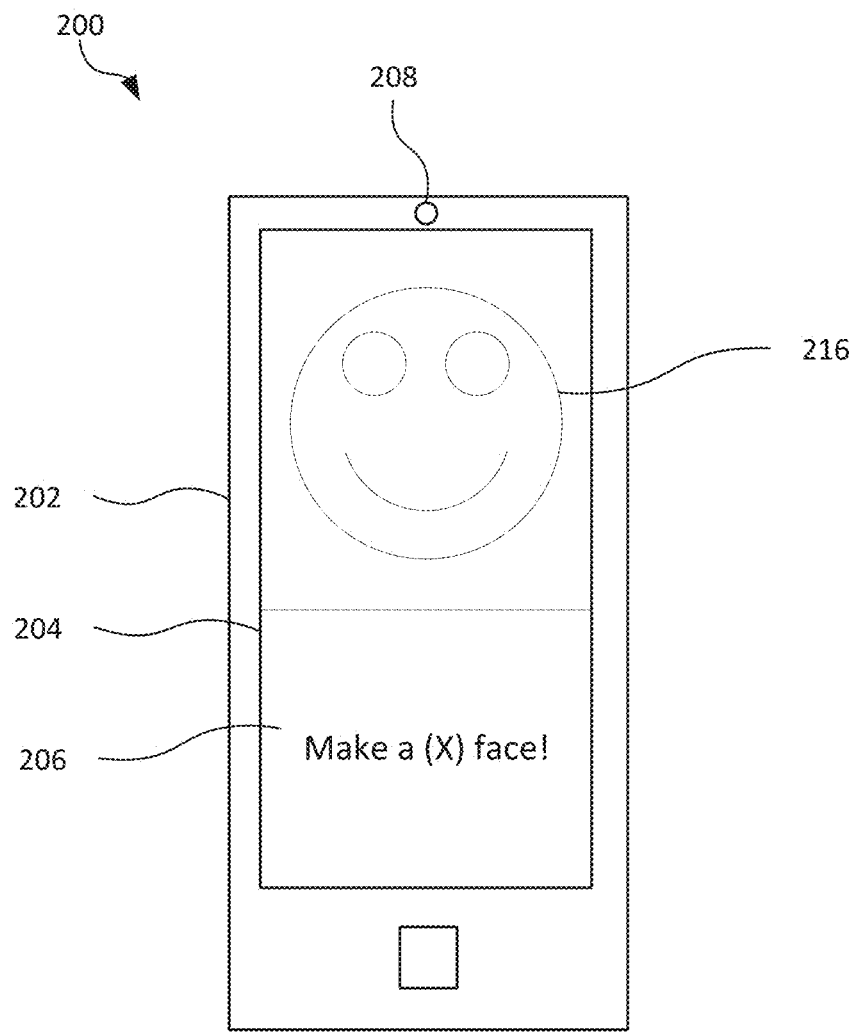
FIG. 11 is a schematic diagram of an apparatus adapted to implement a second aspect of the method.

In another aspect, the method 100 relates to tracking a user's expression in relation to a stimulus. Referring to FIG. 11, the user device 200 is shown with a stimulus 206 presented on the screen 208. The stimulus is a written request to the user requesting that the user perform a particular expression (indicated as (X) in the Figure). The user's face 216 is also shown on the screen, where visual data relating to the user's face is captured using the camera 208, in order to encourage the user to perform the requested expression.

Figure 12:
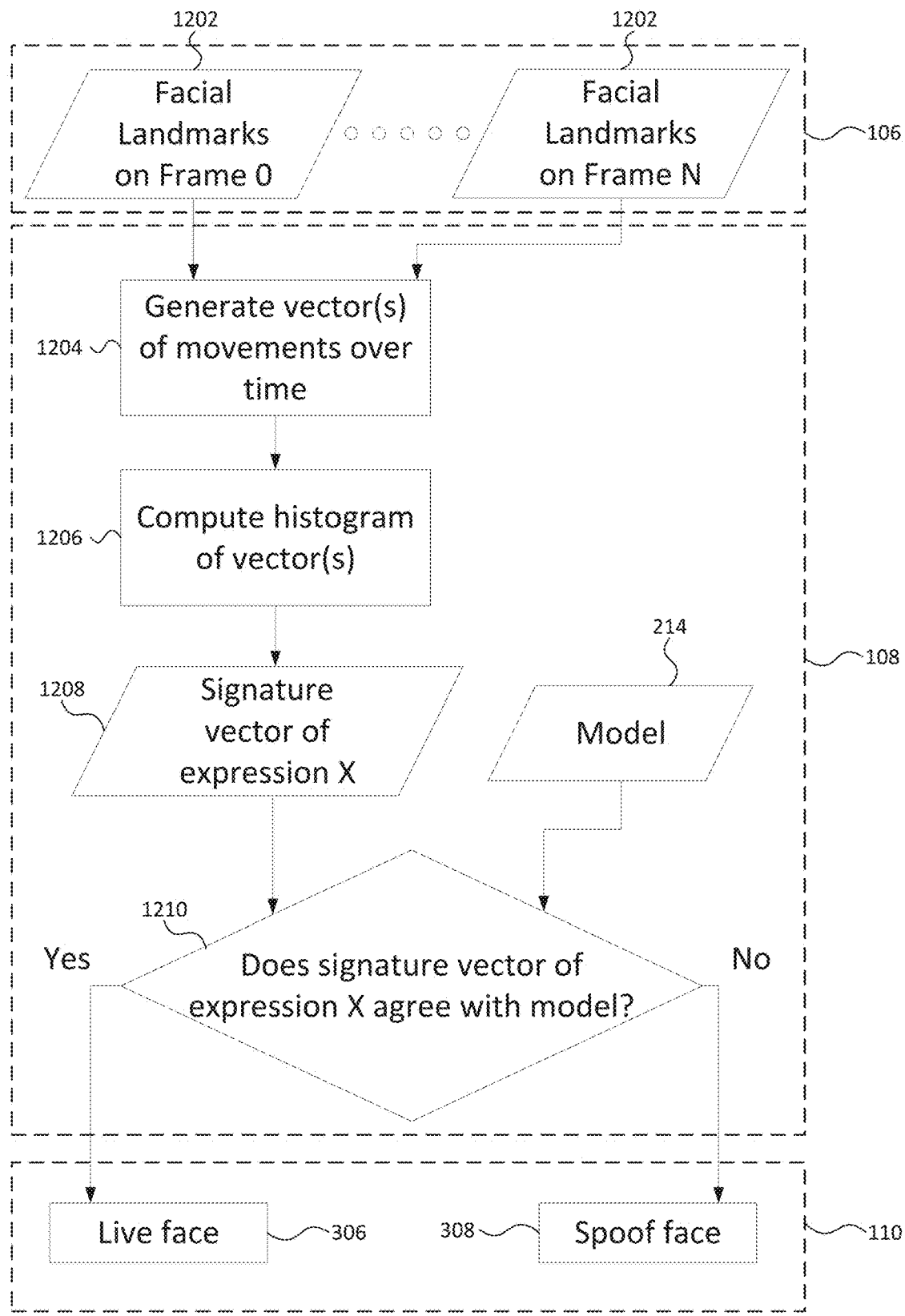
FIG. 12 is a flowchart showing certain steps of the second aspect of the method in more detail.

Referring to FIG. 12, once the user has been presented with the stimulus, the third step 106 of the method 100 is implemented by capturing visual data of the user's face (as the expression is performed, if the user is acting as requested by the stimulus). The visual data comprises a plurality of frames 1202 (i.e. N number of frames), which are continually captured for a pre-determined time period sufficient for a user to perform the requested expression. Alternatively, the method may include a further step of recognising when the user's movement between frames is reduced, which may indicate that a user has finished performing the expression, in which case the continual capture of frames 1202 is paused or halted.

The fourth step 108 of the method 100 is implemented by receiving information in the form of N frames 1202, in a first step 1204, generating one or more vectors of the movement of one or more facial landmarks which are identified in the frames. The facial landmarks are identifiable positions of the face which move as expressions are performed. Facial landmarks may include, for example, the eyelids, the corners of the eyes, eyebrows, the angle of the mouth, and the corners of the mouth, among many other examples. The vectors are generated by comparing at least the $0^{th}$ frame (i.e.

the frame captured immediately after the stimulus is presented, when the user's face is in a neutral position) and the $N^{th}$ frame, although it will be appreciated that more sophisticated scenarios are possible, in which intermediate frames are also used and/or in which multiple vectors are generated over different sets of frames and then combined.

In a second step 1206, a histogram of the vectors is computed. This allows a generalised 'signature vector' 1208 to be generated, which indicates the process of performing the expression for the particular expression and for the particular user.

In a third step 1210, reference is made to a model 214 of live human face movement, which is arranged to provide a prediction of human face movement in response to the stimulus. In this aspect, the prediction is a reference vector for particular expressions which can be requested, such that each expression has corresponding data in the model. As previously described, the model is a trained classifier. The similarity between the signature vector and the reference vector provided by the model is assessed by computing the Euclidean distance between the signature vector and the reference vector, and comparing the computed distance against a threshold.

As previously described, certain properties of the stimulus, the stimulus itself, and/or an identifier of the stimulus are used, in use, as an input to the model, which allows the model to recall (or, alternatively, generate) a particular reference vector that relates to the particular stimulus used. Alternatively, an identifier of the expression (rather than the associated stimulus) is used as an input to the model.

If the computed Euclidean distance is below the threshold (which corresponds to a pre-determined confidence threshold), this indicates that a real user has responded to the request presented in the stimulus by performing the requested expression. As such, it can be determined that a real human face is present, which may be indicated as a positive output 306 in the output step 110.

If however the computed Euclidean distance is above the threshold, a negative output 308 may be indicated in the output step 110, as this indicates that the user has not complied with the request presented in the stimulus, which may indicate that a spoof attack is in progress.

The model 214 is applicable across various users, but it is arranged to adapt to the expressions performed by a particular user as the particular user repeatedly uses the method 1000. This may improve accuracy, as the way in which facial landmarks move when expressions are performed differ between different people. As such, over time the reference vector produced by the model will get closer to the signature vector 1208 of a particular user for a particular expression. The user may be invited to perform various expressions in an initial set-up step, which provides the model with initial data relating to the signature vectors of the user for different expressions. In an alternative, the model is not generic, and is generated in a bespoke manner for a particular user (for example, based on a set-up step, as described).

In an alternative, rather than producing different reference vectors for different expressions, the model may be arranged to generalise across different expressions, for example by observing a typical movement of a particular facial landmark across many (or any/all) expressions.

It will be appreciated that a wide variety of expressions can be used with the method 100, provided that the movement involved with such expressions is primarily facial. Possible expressions include: smiling, frowning, grimacing, looking happy, looking sad, looking fearful, looking angry, looking disgusted, looking appalled, looking cross-eyed, making a 'duck face', opening the eyes and/or mouth wide, sticking out a tongue, or various combinations of the aforementioned. The expression used in the method is selected from a list of possible expressions. The selection may be based on a seed, which is generated as previously described.

Alternatively, the expression requested in the stimulus may itself be generated dynamically as previously described, resulting in an unpredictable expression (which is bounded so as to avoid expressions that are not humanly possible being requested). In such cases, the requested expression may be shown diagrammatically as part of the stimulus, along with instructions such as 'make this face'.

In another aspect, the method 100 relates to tracking a user's expression in relation to a requested word or phrase provided in the stimulus. The user may be requested to say a word by being presented with a simple question, such as 'what is 1+1?' Alternatively, the stimulus may comprise a simple request, such as 'say 'orange''.

Figure 13:
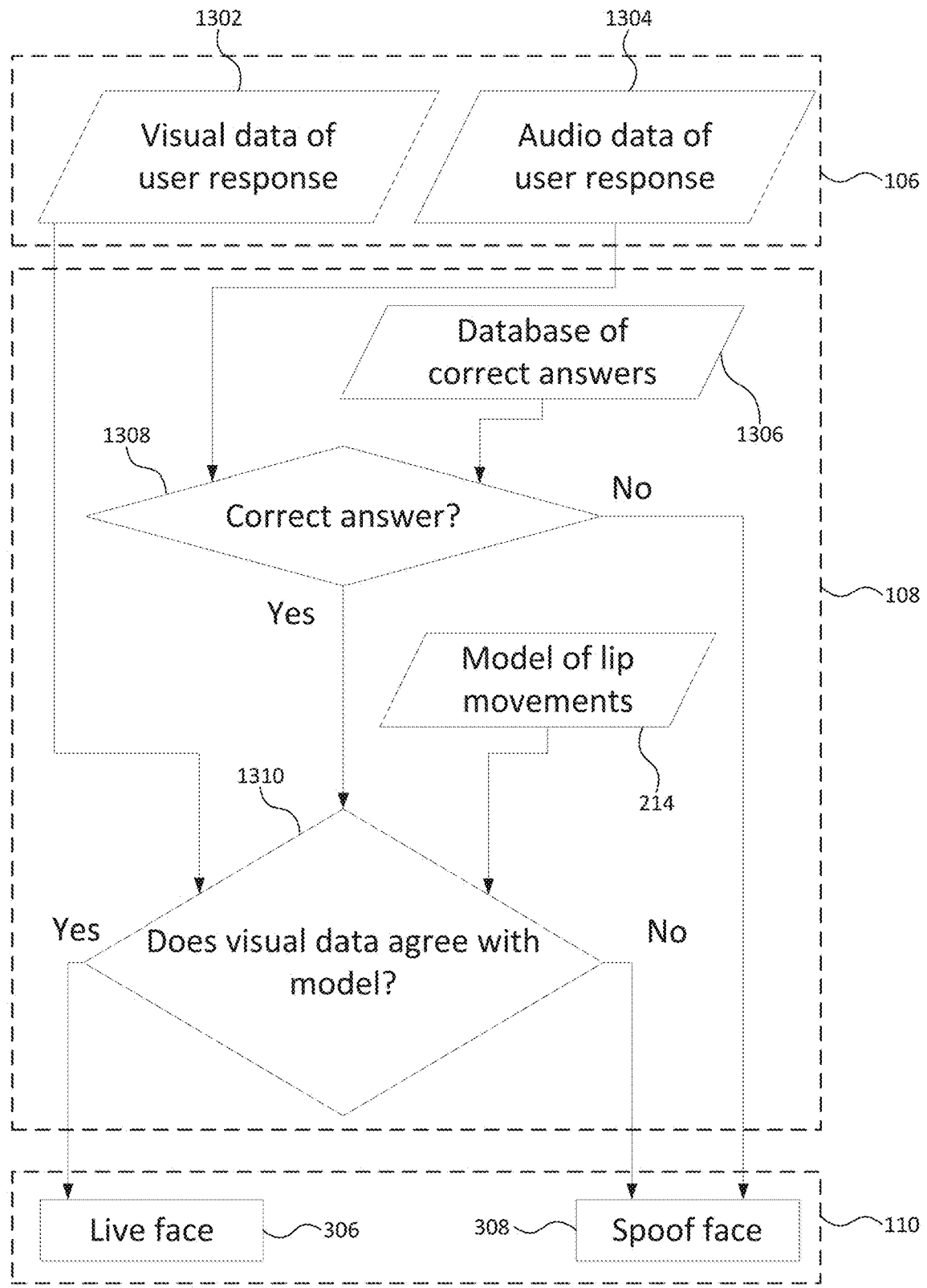
FIG. 13 is a flowchart showing certain steps of a third aspect of the method in more detail.

Referring to FIG. 13, once the user has been presented with the stimulus, the third step 106 of the method 100 is implemented by capturing visual data 1302 of the user's face and audio data 1304 (both of which are captured as the word or phrase is said or mouthed, if the user is acting as requested by the stimulus). The audio data may be captured by using a microphone (not shown) of the user device 200.

The fourth step 108 of the method 100 is implemented by receiving the visual data 1302 and the audio data 1304 and, in a first step 1308, evaluating whether the user has spoken the correct word and/or answered the question correctly. Speech-to-text analysis is performed on the audio data in order to isolate the words spoken by the user. The words are then compared against the contents of a database of correct answers/words for particular stimuli. If it is determined that an answer is incorrect, this indicates that a user has not responded as requested, which may indicate that a spoof attack is in progress. As such, a negative output 308 may be indicated in the output step 110.

If however a correct answer is found (e.g. the audio data comprises the requested word or phrase), a second step 1310 is performed, in which the captured visual data 1302 is compared against a model 214 of expected face movements. In this aspect, the model relates to predicted lip movements that are associated with any particular word or phrase that can be presented as part of the stimulus 206, such that each particular word or phrase has associated data in the model. As previously described, the model is a trained classifier. Data for a particular word or phrase may be referenced by the model by using a corresponding identity of the stimulus (or word or phrase), certain properties of the stimulus, and/or the stimulus itself as one or more inputs to the model, in an analogous manner to that described with reference to models in other aspects.

The similarity between lip movement in the visual data and the modelled lip data is assessed by comparing the movement of facial landmarks (in particular, those on or around the lips), as previously described If the visual data agrees with the modelled visual data within pre-determined confidence thresholds, this indicates that a real user has responded to the request presented in the stimulus by saying the requested word or phrase. As such, it can be determined that a real human face is present, which may be indicated as a positive output 306 in the output step 110.

If however the visual data does not agree with the modelled visual data within pre-determined confidence thresholds, a negative output 308 may be indicated in the output step 110, as this indicates that the user has not complied with the request presented in the stimulus, which may indicate that a spoof attack is in progress.

It will be appreciated that in this aspect security may be improved by using a combination of visual and audio assessment. Asking a question also provides a basic intelligence test, which may assist in overcoming automatic spoofing attacks.

Many different questions or requested phrases can be used in this aspect, although the requests are preferably simple and lead to the user speaking readily recognisable words or phrases. A requested phrase or answer to a question forming part of a stimulus may be generated dynamically as previously described, which may result in a nonsensical (and thus unpredictable) phrase being requested. Alternatively, the possible phrases or answers to questions may be bounded so as to produce more easily predictable (and thus more recognisable phrases). In particular, the possible stimuli may be selected from a list, where the selection is based on a seed, which is generated as previously described.

In an alternative, rather than being specific to different words, the model may be arranged to be a general model, for example where the model recognises the general characteristics of live human speech rather than specific words or phrases, or where the model is arranged to recognise any word or phrase dynamically based on expected lip movements associated with that word or phrase.

In an alternative, the audio data 1304 may not be examined, and the method may use visual data 1302 alone. In such cases, it is sufficient for the user to mouth word or phrases rather than speak them.

Figure 14A:
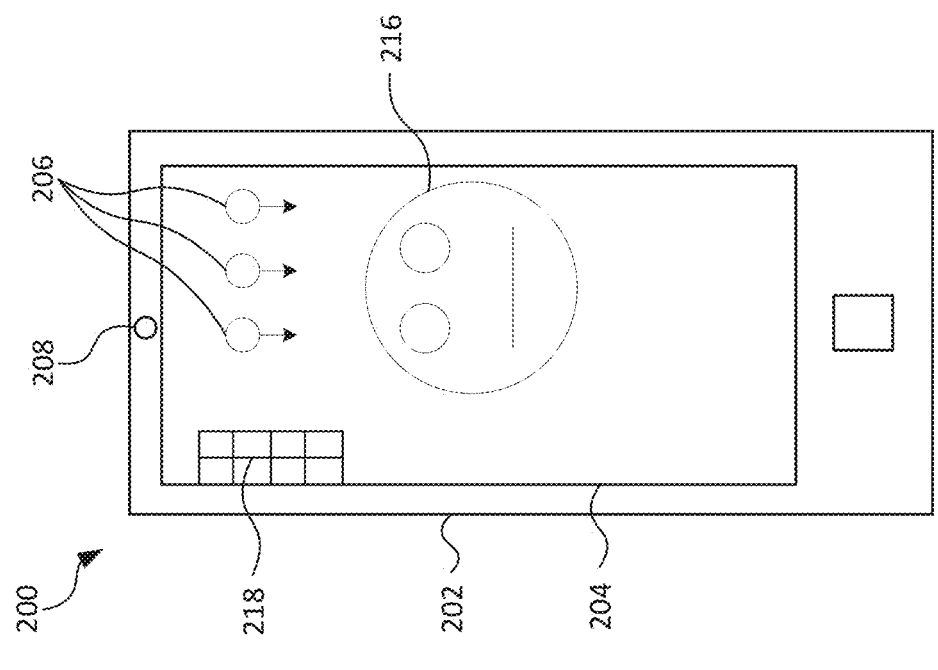
FIG. 14a is a schematic diagram of a user's interaction with the apparatus adapted to implement a fourth aspect of the method.

In another aspect, a method 1600 is provided, which relates to tracking a user's interaction with an interactive game which the stimulus forms a part thereof. Referring to FIG. 14a, such an interactive game is shown on a screen 204 of a user device 200. Stimuli 206 in the form of interactive objects such as animated balls, which 'fall' from the top of the screen to the bottom, are presented on the screen along with a further interactive object 218, which is formed as a goal and is located towards an edge of the screen. The user's face 216 is also shown on the screen, where visual data relating to the user's face is captured using the camera 208. The position of the user's face on the screen changes dynamically as the camera is moved relative to the user's face (or vice versa). The stimuli and the further interactive object form an augmented reality game, where the movement of the user's face is tracked and used in the game. The user's face is modelled as an object within the game which can interact with the stimuli and/or the further interactive object. Determining that a live human face is present may then be based on a model of whether the user's face interacts with the game to a sufficient degree (corresponding to predicted interaction), for example where a live human face is verified if a specific objective (such as scoring a goal by causing a stimuli to interact with the interactive object) is achieved.

The model is a trained classifier, as previously described, where the certain properties of the stimulus, an identifier of the stimulus, and/or the stimulus itself is used as an input to the model to allow the model to recall data related to the particular stimulus.

Figure 14B:
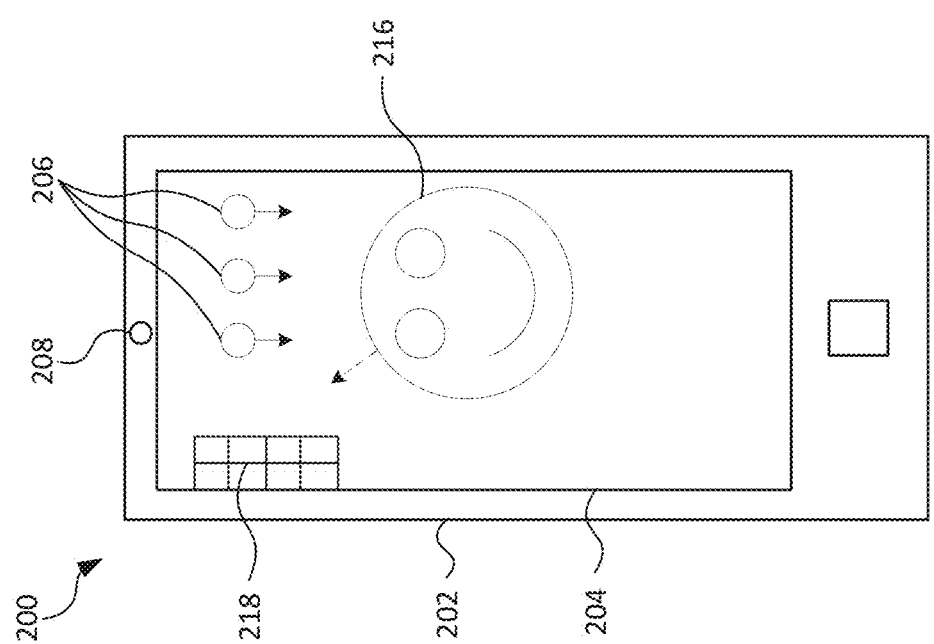
FIG. 14b is a schematic diagram of an interaction of a spoof face with the apparatus adapted to implement the fourth aspect of the method.

Referring to FIG. 14b, a scenario in which a spoof face is presented is shown. The face does not move relative to the camera and so the game is failed, so a live human face is not detected.

Alternatively, the stimuli (or stimulus) used are generated dynamically (as previously described), in order to ensure that the same scenario does not recur (or rarely recurs), which mitigates the possibility of an attack being based on a previous scenario. The model may then be configured to determining whether a live human face is present irrespective of the stimuli used (i.e. it is a general model).

It will be appreciated that various types of games are possible, provided that the games are set up so that movement of the user's face relative to the camera is required for a user to complete an objective.

In another aspect, the method 100 relates to determining whether a live human face is present by constructing a three dimensional (3D) image. This may assist in overcoming attacks based on two dimensional (2D) representations of faces, such as printed photographs or still image or videos replayed on a display such as on a smartphone, tablet, laptop, TV.

In order for a 3D image to be constructed, a variety of frames of a face are required, where the face is oriented differently relative to a camera in the different frames.

Figure 15C:
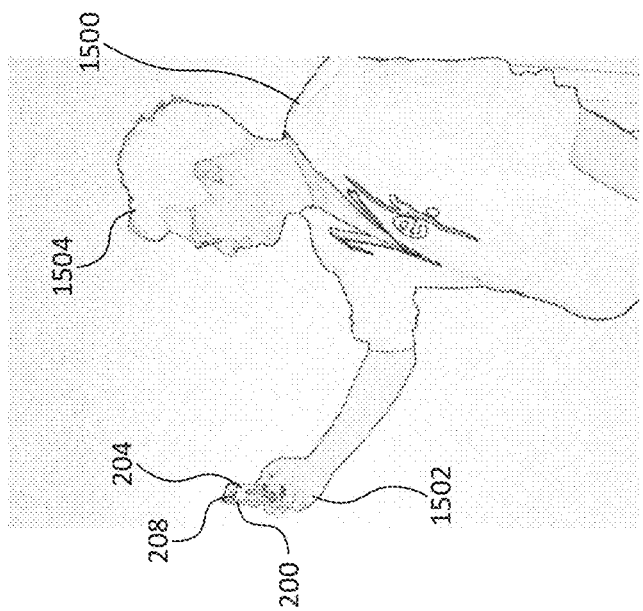
FIGS. 15a, 15b and 15c are schematic drawings showing the movement of a user device relative to a user in response to a user being requested to take a picture of themselves.
Figure 15B:
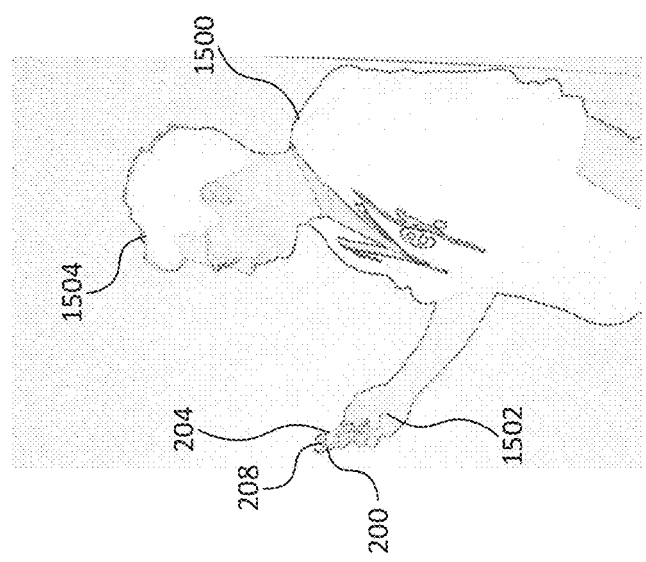
Figure 15A:
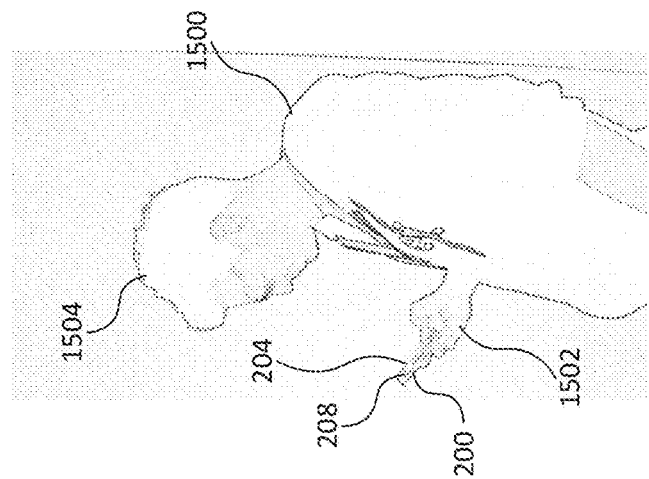

Referring to FIGS. 15a to 15c, the position relative to a user 1500 of a user device 200 having a camera 208 is shown as a user is shown a stimulus requesting that the user take a picture of themselves (referred to as a 'selfie'). In FIG. 15a, the user is holding the user device in a normal standing reading position (which may be referred to as 'user mode'), in which the user holds the user device in their hand 1502 close towards their body at an upward angle, while the user's head 1504 is angled downwardly to view the user device. The user may then be invited to take a selfie via a stimulus shown on the screen 204 of the user device. Knowing that in order to get a good shot that their face should be in the frame and that the camera should be generally facing their face in a level position, the user extends their arm, raises their hand (holding the user device) and raises their head to a level position. As such, the camera and the user's face rotate so as to face each other, while the distance between them increases.

An image of the user is shown on the screen (using visual data from the camera) in order to assist the user with locating the user device correctly. FIG. 15c shows the final position of the user device relative to the user (which may be referred to as 'selfie mode'), and FIG. 15b shows a transitory state between user mode and selfie mode.

The described movement of the user device allows a variety of frames of the user's face to be captured in different orientations, while ensuring that the whole face of the user is in frames. It will be appreciated that other requests other than the user being requested to take a selfie are also possible, including a simple request that the user moves the user device away from their face, around the face, or makes any other movement of the device relative to the face (or vice versa).

Figure 16:
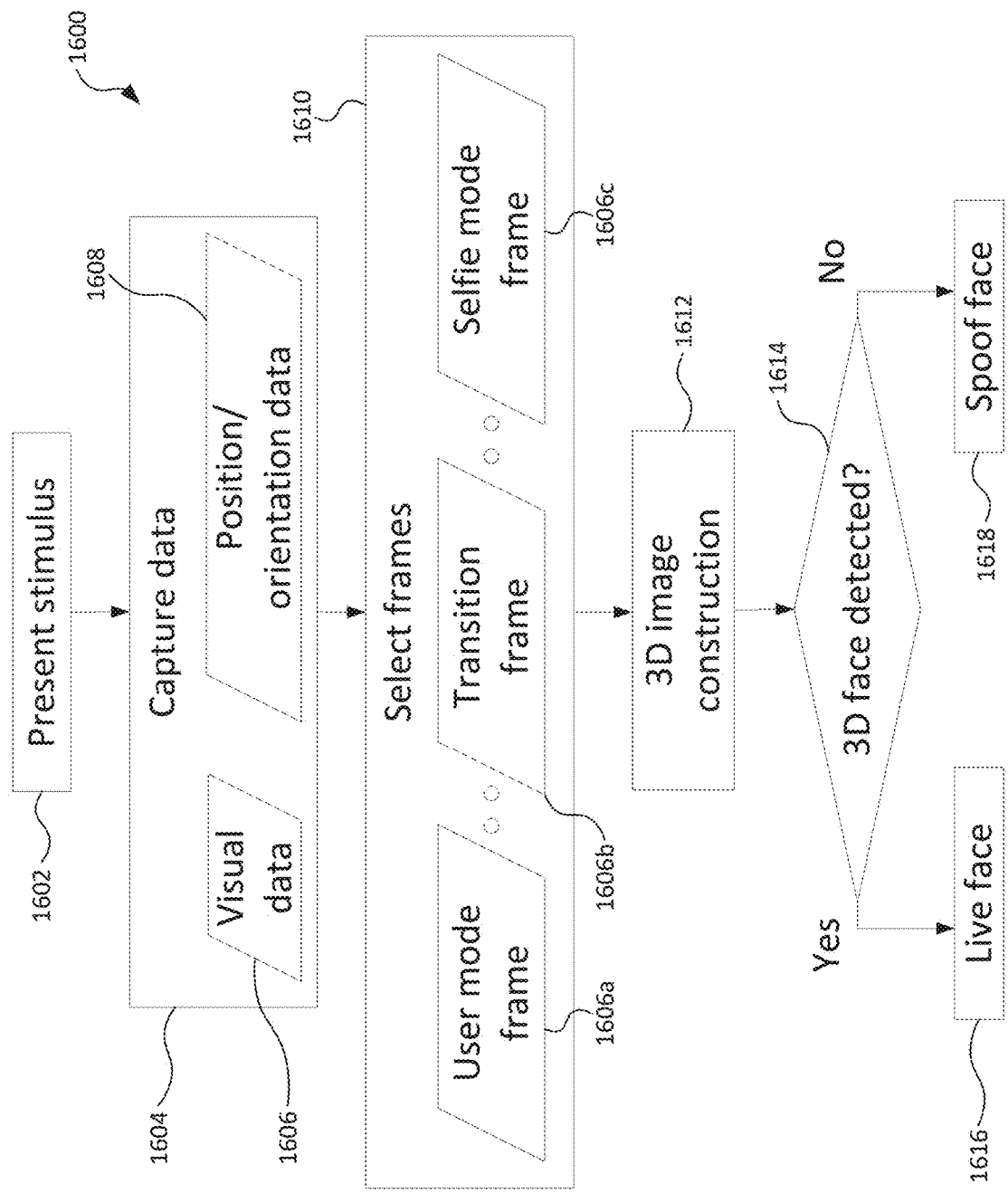
FIG. 16 is a flow chart of a further aspect of the method.

Referring to FIG. 16, the steps of the method 1600 are shown in detail. In a first step 1602, the stimulus is presented to the user, which causes the user to move the user device 100 as described.

In a second step 1604, data related to the movement is captured by the user device. The captured data comprises visual data 1606 (captured via the camera 208) and data 1608 relating to the position and/or orientation of the user device, which is captured via sensors of the user device, such as an internal gyroscope, an accelerometer, and/or a position sensor.

In a third step 1610, relevant frames of the visual data are selected, where the relevance of the frames is judged on their utility in constructing a 3D image. These frames are selected on the basis of sensor data, such as data from the gyroscope or the accelerometer. For example, such data may be used to determine timestamps of video frames that needs to be taken for 3D reconstruction. The possible relevant frames include all frames taken from when the user starts moving camera from user mode to when the device is in selfie mode. The selected frames comprise a user mode frame 1606a (corresponding to user mode, as shown in FIG. 15a), a selfie mode frame (corresponding to selfie mode, as shown in FIG. 15c), and one or more transition frames (corresponding to one or more user modes, as shown in FIG. 15b). The position and/or orientation data 1608 is associated with each selected frame by use of the timestamp.

In a fourth step 1612, a 3D image of the user's face is constructed based on the selected frames. A wide range of existing tools and/or software packages can be used to calculate the 3D structure of the user's face from the motion, such as Theia.

In the fifth step 1614, the constructed 3D image is tested to determine whether it is a 3D image or a planar image. For example, if a replay attack (i.e. video replayed on a planar display) is in progress, the 3D construction will produce a planar image. However, if it is an actual person in front of the camera, the 3D reconstruction will produce a non-planar 3D image with depth. If the constructed image does show a real 3D face, this indicates that a live human is present, which may be indicated as a positive output 1616. If, however, a 3D face is not represented by the constructed image, a negative output 1618 may be indicated.

It will be appreciated that the aspect described with reference to FIG. 16 may be implemented using the previously described apparatus 200, optionally where the tracking module 256 is replaced with one or both of a data capture module and a frame selection module for performing the second step 1604 and the third step 1610 respectively. The verification module 258 may then be used to perform the fourth step 1612 and fifth step 1614. Other hardware (such as a similar user device having a camera and a processor) may be used in alternative implementations of the aspect described with reference to FIG. 16.

Alternatives and Extensions

It will be appreciated that the various aspects described above are arranged to be used together, such that security weaknesses (to the extent that they exist) in any one of the aspects may be covered by a complementary aspect. The aspects may be performed one after the other, in any order, to verify that or determine whether a live human face is present. A method may be provided in which, if a live human face is not verified, or is verified with a relatively low degree of confidence, by one aspect of the method, another aspect of the method may be used, and an overall confidence score may be produced. When the overall confidence score is above a threshold, the presence of a live human face may be verified.

Features of the described aspects may also be combined in any combination, for example such that the various aspects are performed simultaneously or in parallel (in simple examples, the user could be requested to perform an expression and take part in an interactive game at the same time, or to take a photograph of themselves (allowing a 3D image to be constructed) performing a particular expression).

Where the generation of a stimulus is described, in an alternative a stimulus may not be generated each time the method 100 is used, and one or more of a number of pre-determined template stimuli may be used instead.

Where the presentation of a single stimulus is described, in an alternative, more than one stimulus may be presented on screen at a single time.

In an alternative, a correspondence vector may be used instead of the correspondence distance, which may allow for more sophisticated modelling and eye tracking.

Where the model 214 is described, in an alternative, the model 214 is not stored on the device, and instead is stored remotely, and may be queried over an internet connection. In particular, the model 214 may be hosted remotely on a cloud server, where the user device sends data related to the correspondence distance over time (and optionally data related to the properties of the stimulus) to the model 214 and receives a response indicating whether a live human face is present.

Where the seed is described, the seed optionally comprises (or wholly consists of) a random or pseudorandom element, which may, for example, be based on a pseudo-random number generator. A stimulus generated based on such a seed may be considered to be a 'random stimulus'. For both a random stimulus and a non-random stimulus, certain properties of the stimulus may be bounded (for example, the path may be bounded so as to stay on the screen).

The method 100 described methods may be implemented on any kind of portable user device having a screen and a camera, such as a smartphone, a laptop computer, a desktop computer, or a tablet computer. Alternatively, the method 100 may be implemented using a static device, such as those that might be included as part of or in association with entry systems, doors, automated passport control gates, or any other kind of system or device (static or otherwise) implementing a facial recognition system.

Any device or apparatus implementing the described methods method 100 may comprise a NFC reader adapted to read a NFC chip provided as part of an identity-certifying document (such as a passport), which may allow data provided in the NFC chip to be compared to a face of the user that is verified using the method 100 (as well as optionally allowing comparison between the data in the NFC chip and any photograph provided as part of the document).

It will be appreciated that alternative components to a screen may be used for presenting the stimulus, such as a flat surface on to which the stimulus is projected.

Alternatively, movement of other parts of the face other than those described may be may be tracked. For example, where the user's eyes are tracked, a movement of the user's brow may be tracked along with the user's eyes. In a further example, the stimulus may be a message on screen inviting the user to perform a particular expression (for example, the message may display 'please smile'), whereupon a movement of part of the user's face in response to the stimulus is tracked and compared against a model to determine whether a live human face is present.

Alternatively, the stimulus may be non-visual in nature—for example, the user device may play an audio message inviting the user to look in a particular direction.

It will be understood that the invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

What is claimed is:

1. A method of determining whether a live human face is present, comprising:

generating a moving stimulus;

predicting, using a model, human face movement in response to the presentation of said generated moving stimulus on a screen, wherein the model models a predicted correspondence distance between a modelled location of a gaze of a human face on the screen and a location of the said generated moving stimulus on the screen at a particular time;

presenting the generated moving stimulus on the screen to a presented human face;

using a camera for tracking a movement of the presented human face in B response to the generated moving stimulus presented on the screen, wherein tracking the movement of the presented human face comprises:

determining a tracked location of the gaze of the presented human face on the screen;

tracking a movement of the tracked location of the gaze of the presented human face; and calculating a correspondence distance between the tracked location of the gaze of the presented human face and the location of the generated moving stimulus on the screen at a particular time; and determining whether the presented human face is a live human face by comparing the predicted human face movement against said tracked movement of the presented human face.

2. A method according to claim 1, wherein the model represents live human face movement in response to the said generated moving stimulus.

3. A method according to claim 1, wherein the generated moving stimulus is generated in dependence on a varying parameter.

4. A method according to claim 3, further comprising generating the varying parameter in dependence on one or more dynamic properties.

5. A method according to claim 4, wherein the one or more dynamic properties are properties of a user device adapted to implement the method; optionally wherein the one or more properties comprise one or more of: clock time; location; orientation; rotation; and acceleration.

6. A method according to claim 3, wherein the varying parameter comprises a random element.

7. A method according to claim 1, wherein the generated moving stimulus is a visual stimulus.

8. A method according to claim 7, wherein the color, luminance and/or orientation of the generated moving stimulus is generated in dependence on the varying parameter.

9. A method according to claim 7, wherein the generated moving stimulus varies in size as it moves.

10. A method according to claim 1, wherein the generated moving stimulus moves continuously.

11. A method according to claim 1, wherein the generated moving stimulus moves along a path, the path being generated in dependence on the varying parameter; optionally wherein a starting location and/or ending location of the path are generated in dependence on the varying parameter.

12. A method according to claim 1, wherein the method further comprises comparing the correspondence distance against the predicted correspondence distance for a particular time.

13. A method according to claim 12, wherein calculating the correspondence distance is performed at the same time as presenting the generated moving stimulus to the face.

14. A method according to claim 1, wherein one or more properties of the generated moving stimulus are used as inputs for the model.

15. A method according to claim 1, wherein the model comprises historic data; optionally related to the presented human face to which the generated moving stimulus is presented.

16. A computer program product, stored on a non-transitory computer readable medium, comprising software code adapted to carry out the method of claim 1.

17. A system for determining whether a live human face is present, the system comprising:

a display for displaying a generated moving stimulus;

a camera for capturing visual data of a presented human face;

a data store for storing a model of live human face movement; and a processor adapted to execute the computer program product of claim 16.

18. A system for determining whether a live human face is present, comprising:

a user device, comprising:

a module adapted to generate a moving stimulus;

a module adapted to present the generated moving stimulus on a screen to a presented human face;

a module adapted to track a movement of the presented human face in response to the generated moving stimulus which is presented on the screen by:

determining a tracked location of a gaze of the presented human face on the screen;

tracking a movement of the location of the gaze of the presented human face; and calculating a correspondence distance between the tracked location of the gaze of the presented human face and the location of the generated moving stimulus on the screen at a particular time; and a remote prediction module adapted to predict, using a model, human face movement in response to the presentation of said generated moving stimulus, wherein the model models a predicted correspondence distance between a modelled location of a gaze of a human face on the screen and a location of the said generated moving stimulus on the screen at a particular time;

a remote determination module adapted to determine whether the presented human face is a live human face by comparing the tracked movement of the presented human face against said predicted human face movement.

* * * * *